(12) United States Patent
Cao et al.

(10) Patent No.: US 12,219,553 B2
(45) Date of Patent: Feb. 4, 2025

(54) CONFIGURATION, INDICATION AND ACK/NACK FOR MULTIPLE HARQ GRANT-FREE TRANSMISSION

(71) Applicant: Huawei Technologies Co., Ltd., Shenzhen (CN)

(72) Inventors: Yu Cao, Ottawa (CA); Jianglei Ma, Ottawa (CA); Liqing Zhang, Ottawa (CA); Zhengwei Gong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 170 days.

(21) Appl. No.: 16/360,774

(22) Filed: Mar. 21, 2019

(65) Prior Publication Data

US 2019/0230691 A1 Jul. 25, 2019

Related U.S. Application Data

(63) Continuation of application No. PCT/CN2017/113291, filed on Nov. 28, 2017.

(60) Provisional application No. 62/475,850, filed on Mar. 23, 2017.

(51) Int. Cl.
| | |
|---|---|
| *H04W 72/12* | (2023.01) |
| *H04L 1/18* | (2023.01) |
| *H04L 1/1812* | (2023.01) |
| *H04L 5/00* | (2006.01) |
| *H04W 72/1268* | (2023.01) |
| *H04W 72/23* | (2023.01) |

(52) U.S. Cl.
CPC ....... *H04W 72/1268* (2013.01); *H04L 1/1816* (2013.01); *H04L 5/0007* (2013.01); *H04L 5/0042* (2013.01); *H04L 5/0044* (2013.01); *H04W 72/23* (2023.01)

(58) Field of Classification Search
CPC .......... H04W 72/1268; H04W 72/1289; H04L 5/0007; H04L 1/1816; H04L 5/0044; H04L 5/0042; H04L 1/1822; H04L 1/1893
See application file for complete search history.

(56) References Cited

U.S. PATENT DOCUMENTS

| | | | |
|---|---|---|---|
| 10,686,567 B2 * | 6/2020 | Kim | H04L 1/1851 |
| 2010/0115360 A1 | 5/2010 | Seok et al. | |

(Continued)

FOREIGN PATENT DOCUMENTS

| | | |
|---|---|---|
| CN | 101106439 A | 1/2008 |
| CN | 101132262 A | 2/2008 |

(Continued)

OTHER PUBLICATIONS

LG Electronics, "Discussion on URLLC HARQ operation and reliability enhancement schemes," 3GPP TSG RAN WG1 NR Ad-hoc Meeting, R1-1700514, Spokane, USA, Jan. 16-20, 2017, 6 pages.

(Continued)

*Primary Examiner* — Hoang-Chuong Q Vu
(74) *Attorney, Agent, or Firm* — Slater Matsil, LLP

(57) ABSTRACT

Provided is a method in a user equipment, the method comprising: as part of a HARQ process having a HARQ process ID, transmitting an initial grant-free transmission and K−1 repetitions, where K>=2. A pre-defined mapping of the HARQ process ID to at least one resource available for grant-free transmission is a function of K.

25 Claims, 20 Drawing Sheets

(56) References Cited

U.S. PATENT DOCUMENTS

| | | | |
|---|---|---|---|
| 2014/0245095 A1* | 8/2014 | Nammi | H04L 5/0055 |
| | | | 714/749 |
| 2015/0173113 A1 | 6/2015 | Liu et al. | |
| 2017/0311340 A1 | 10/2017 | Wu et al. | |
| 2017/0346606 A1* | 11/2017 | Li | H04L 1/1822 |
| 2017/0367110 A1* | 12/2017 | Li | H04W 72/1268 |
| 2018/0070341 A1* | 3/2018 | Islam | H04L 5/0064 |
| 2018/0123765 A1* | 5/2018 | Cao | H04L 1/1819 |
| 2018/0123767 A1* | 5/2018 | Islam | H04L 1/1816 |
| 2018/0160445 A1* | 6/2018 | Babaei | H04W 72/14 |
| 2018/0176945 A1* | 6/2018 | Cao | H04L 5/0055 |
| 2018/0183645 A1* | 6/2018 | Meng | H04L 5/00 |
| 2018/0199255 A1* | 7/2018 | Tang | H04W 36/26 |
| 2018/0219649 A1* | 8/2018 | Ying | H04W 76/27 |
| 2018/0270807 A1* | 9/2018 | Salem | H04W 72/0413 |
| 2018/0270880 A1* | 9/2018 | Hosseini | H04L 1/0009 |
| 2019/0058986 A1* | 2/2019 | Loehr | H04L 1/1825 |
| 2019/0074936 A1* | 3/2019 | Lee | H04W 76/28 |
| 2019/0149273 A1* | 5/2019 | Golitschek Edler von Elbwart | H04L 1/1854 |
| | | | 714/748 |
| 2019/0357222 A1* | 11/2019 | Lou | H04W 72/082 |
| 2019/0393988 A1* | 12/2019 | Bae | H04W 72/0446 |
| 2020/0008216 A1* | 1/2020 | Iyer | H04W 72/04 |
| 2020/0045722 A1* | 2/2020 | Bae | H04W 72/569 |
| 2020/0154400 A1* | 5/2020 | Byun | H04L 5/0048 |
| 2020/0213984 A1* | 7/2020 | Hwang | H04W 72/0453 |
| 2020/0236657 A1* | 7/2020 | Zhang | H04W 72/04 |
| 2020/0275465 A1* | 8/2020 | Horiuchi | H04L 5/0055 |
| 2020/0313799 A1* | 10/2020 | Bae | H04W 72/0446 |
| 2020/0337068 A1* | 10/2020 | Yi | H04L 5/0094 |
| 2021/0144700 A1* | 5/2021 | Lee | H04L 5/00 |
| 2021/0289539 A1* | 9/2021 | Byun | H04L 5/0051 |
| 2022/0174741 A1* | 6/2022 | Myung | H04W 72/14 |
| 2023/0066772 A1* | 3/2023 | Myung | H04W 74/0808 |

FOREIGN PATENT DOCUMENTS

| | | |
|---|---|---|
| CN | 103533533 A | 1/2014 |
| CN | 104158640 A | 11/2014 |
| CN | 106063355 A | 10/2016 |
| RU | 2434365 C2 | 11/2011 |
| WO | 2010009425 A2 | 1/2010 |
| WO | 2016119651 A1 | 8/2016 |
| WO | 2016206083 A1 | 12/2016 |
| WO | 2017000143 A1 | 1/2017 |
| WO | 2018169347 A1 | 9/2018 |

OTHER PUBLICATIONS

ZTE et al., "Basic Grant-free Transmissions for URLLC", 3GPP TSG RAN WG1 Meeting #88, R1-1701594, Feb. 13-17, 2017, 8 pages, Athens, Greece.

Huawei et al., "UL Grant-free transmission", 3GPP TSG RAN WG1 Meeting #88, R1-1701665, Feb. 13-17, 2017, 15 Pages, Athens, Greece.

NTT Docomo, Inc., "On eMBB and URLLC multiplexing for uplink", 3GPP TSG RAN WG1 Meeting #88, R1-1702818, Feb. 13-17, 2017, 5 Pages, Athens, Greece.

Samsung, "Discussion on grant-free based multiple access", 3GPp TSG RAN WG1 Meeting #86bis, R1-1609037, Oct. 10-14, 2016, 4 Pages, Lisbon , Portugal.

Samsung, Support of HARQ in grant-free based multiple access, 3GPP TSG RAN WG1 Meeting #86, R1-1609039, Oct. 10-14, 2016, 4 Pages, Lisbon, Potugal.

Samsung, "Discussion on grant-free/contention-based non-orthognal multiple access", 3GPP TSG RAN WG1 Meeting #86, R1-166752, Aug. 22-26, 2016, 5 Pages, Gothenburg, Sweden.

Samsung, "Grant-free based multiple access", 3GPP TSG RAN WG1 NR Ad Hoc, R1-1701003, Jan. 16-20, 2017, 4 pages, Spokane, Washington.

HTC, "HARQ retransmission in grant-free NOMA", 3GPP TSG RAN WG1 NR Ad-Hoc Meeting, R1-1701009, Jan. 16-20, 2017, 5 Pages, Spokane, USA.

NTT Docomo, "On URLLC scheduling and HARQ mechanism", 3GPP TSG RAN WG1 Meeting #87, R1-1612713, Nov. 14-18, 2016, 9 Pages, Reno, USA.

* cited by examiner

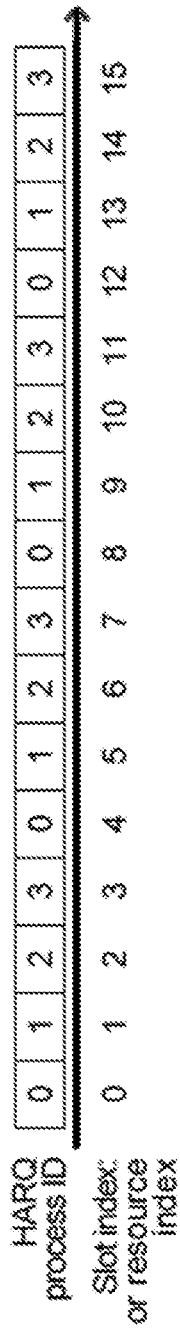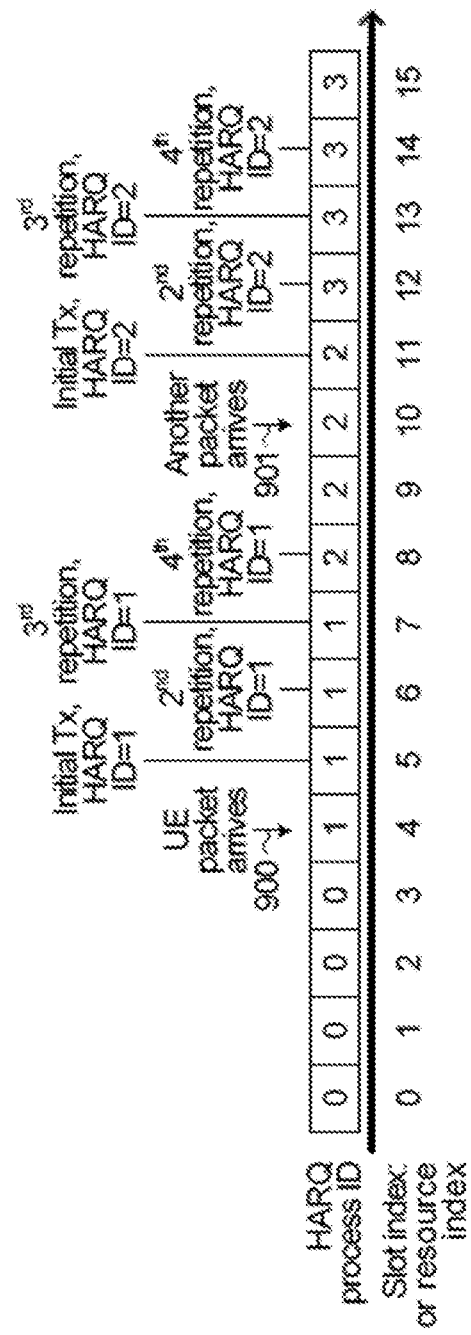

| Field Name | Length (bits) | 1st bit | 2nd bit |
|---|---|---|---|
| UE position index 1 | 2 | Activity detected or not | Data decoded or not |
| UE position index 2 | 2 | Activity detected or not | Data decoded or not |
| ⋮ | ⋮ | Activity detected or not | Data decoded or not |
| UE position index N | 2 | Activity detected or not | Data decoded or not |

FIG. 11

| Field Name | | Length (bits) | 1st bit | 2nd bit |
|---|---|---|---|---|
| UE index 1 | HARQ process 0 | 2 | Activity detected or not | Data decoded or not |
| | HARQ process L | 2 | Activity detected or not | Data decoded or not |
| UE index 2 | ... | 2 | Activity detected or not | Data decoded or not |
| ... | ... | ... | Activity detected or not | Data decoded or not |
| UE index N | ... | 2 | Activity detected or not | Data decoded or not |

FIG. 12

| Field Name | | Length (bits) | 1st bit | 2nd bit |
|---|---|---|---|---|
| GF resource index 1 | MA signature index 0 | 2 | Activity detected or not | Data decoded or not |
| | MA signature index M | 2 | Activity detected or not | Data decoded or not |
| GF resource index 1 | ... | 2 | Activity detected or not | Data decoded or not |
| ... | ... | ... | Activity detected or not | Data decoded or not |
| GF resource index N | ... | 2 | Activity detected or not | Data decoded or not |

FIG. 13

| Field Name | | Length (bits) | 1st bit | 2nd bit |
|---|---|---|---|---|
| UE index 1 | MA signature index 0 | 2 | Activity detected or not | Data decoded or not |
| | MA signature index M | 2 | Activity detected or not | Data decoded or not |
| UE index 2 | ... | 2 | Activity detected or not | Data decoded or not |
| ... | ... | ... | Activity detected or not | Data decoded or not |
| UE index N | ... | 2 | Activity detected or not | Data decoded or not |

FIG. 14

| Field Name | Length (bits) | 1st bit | 2nd bit | HARQ process number/ID |
|---|---|---|---|---|
| UE index 1 | 2 | Activity detected or not | Data decoded or not | 1~3 bits, length predefined |
| UE index 2 | 2 | Activity detected or not | Data decoded or not | ⋮ |
| ⋮ | ⋮ | Activity detected or not | Data decoded or not | ⋮ |
| UE index N | 2 | Activity detected or not | Data decoded or not | ⋮ |

FIG. 15

| Value | Number of ACK/NACKs | ACK/NACK | UE ID 1 | HARQ process number for UE 1 | ... | UE ID M | HARQ process number for UE M |
|---|---|---|---|---|---|---|---|
| Value | M | ACK | UE identity | 0, 1,..., or L | ... | | |
| Length | Predefined | 1 | fixed | ... | ... | ... | ... |
| Meaning | | ACK or NACK | | | | | |

FIG. 16

| | Number of ACK/NACKs | ACK/NACK | UE ID 1 | HARQ process number for UE 1 | ... | UE ID M | HARQ process number for UE M |
|---|---|---|---|---|---|---|---|
| Value | M | NACK | MA signature index | 0, 1,..., or L | ... | | |
| Length | Predefined | 1 | fixed | ... | ... | ... | ... |
| Meaning | | ACK or NACK | | ... | ... | ... | ... |

FIG. 17

| | DCI format 0 |
|---|---|
| TPC command for scheduled PUSCH | set to '00' |
| Cyclic shift DM RS | set to '000' (or the CS of the TB it ACKs to) |
| Modulation and coding scheme and redundancy version | set to '11111' |
| Resource block assignment and hopping resource allocation | set to all '1's |
| HARQ process number | The actual HARQ process number for termination or N/A |
| Modulation and coding scheme | N/A |
| Redundancy version | N/A |
| Resource block assignment | N/A |

FIG. 18

| TB1 |
|-----|
| TB2 |

FIG. 23

| CB1 | CB2 | CB3 | CB4 |
|-----|-----|-----|-----|

1st Transmission

| CB1 | CB2 |
|-----|-----|

2nd Transmission

| CB1 | CB2 |
|-----|-----|

FIG. 25

CONFIGURATION, INDICATION AND ACK/NACK FOR MULTIPLE HARQ GRANT-FREE TRANSMISSION

CROSS-REFERENCE TO RELATED APPLICATIONS

This application is a continuation of PCT/CN2017/113291 filed on Nov. 28, 2017 entitled "Configuration, Indication and ACK/NACK for Multiple HARQ Grant-Free Transmission," which claims priority to U.S. Provisional Patent Application No. 62/475,850 filed Mar. 23, 2017 entitled "Configuration, Indication and ACK/NACK for Multiple HARQ GF Transmission", both of which applications are hereby incorporated by reference herein as if reproduced in their entireties.

FIELD

The present application relates to grant-free uplink transmissions.

BACKGROUND

In some wireless communication systems, a user equipment (UE) wirelessly communicates with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

Some wireless communication systems may support grant-based uplink transmissions. That is, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency-division multiple access (OFDMA) frame.

Some wireless communication systems may also or instead support grant-free uplink transmissions. That is, a UE may send uplink transmissions using certain uplink resources possibly shared with other UEs, without specifically requesting use of the resources and without specifically being granted the resources by the base station. A grant-free uplink transmission does not need a dynamic and explicit scheduling grant from the base station.

In some cases, when a UE sends a grant-free uplink transmission, the base station may not be able to decode the data in the uplink transmission.

SUMMARY

Hybrid automatic repeat request (HARQ) is a method in which data to be transmitted is encoded using an error correction code. Then, if the encoded data is corrupted during transmission and the receiver is unable to correct the errors, automatic repeat request (ARQ) is performed.

The HARQ signaling for grant-based uplink transmissions may not be available for grant-free uplink transmissions because grant-free uplink transmissions do not receive an explicit scheduling grant from the base station.

Systems and methods are disclosed herein for performing HARQ for grant-free uplink transmissions. Signaling relating to the ACK/NACK for the HARQ, as well as signaling relating to configuring a UE for grant-free uplink transmission, is also disclosed.

By using the systems and methods described herein, HARQ signaling for grant-free uplink transmissions may therefore be provided. In particular, some embodiments below provide support for ACK/NACK feedback for grant-free transmissions and retransmissions.

Embodiments of the invention provide for grant-free transmission that can support multiple HARQ transmissions (multiple transport blocks (TBs)) from the same UE, and provide mechanisms for ACK termination for multiple TBs. An embodiment of the invention provides a method in a network element to configure grant-free resources for a user equipment, the method comprising: the base station transmitting signaling to configure multiple sets of resources corresponding to multiple hybrid automatic repeat request (HARQ) processes for the user equipment.

Another broad aspect of the invention provides a method comprising performing activity detection and HARQ process identification for grant-free (GF) transmissions, wherein GF resources are configured for multiple HARQ processes, wherein performing HARQ process identification is based on a predefined relationship between HARQ ID and transmission resources for an initial GF transmission of the GF transmissions.

Another broad aspect of the invention provides a method comprising: receiving a GF transmission associated with a HARQ process ID, the transmission including an explicit or implicit indication of a HARQ process ID.

Another broad aspect provides a base station or a UE configured to perform any of the above-summarized methods.

Another broad aspect of the invention provides a method in a user equipment comprising: receiving signalling transmitted in accordance with the method summarized above to configure resources for multiple HARQ processes, and transmitting a grant-free transmission with HARQ processes using the resources configured.

Another broad aspect of the invention provides a method in a user equipment comprising: making multiple HARQ process transmissions based on a predefined relationship between HARQ process ID and resources for initial transmissions, consistent with one of the above summarized methods.

Another broad aspect of the invention provides a method in a user equipment comprising: making multiple HARQ process transmissions with an implicit or explicit indication of HARQ process during grant free transmission, consistent with one of the above summarized methods.

Another broad aspect provides a user equipment or a network element configured to implement one of the above summarized methods.

According to one aspect of the present invention, there is provided a method in a UE, the method comprising: as part of a HARQ process having a HARQ process ID, transmitting an initial grant-free transmission and K−1 repetitions, where K>=2; wherein a pre-defined mapping of the HARQ process ID to at least one resource available for grant-free transmission is a function of K. Advantages of this approach that may be realized in some implementations include:

For a UE that is configured with repetition number K, if the UE can start at only the beginning of the K resources, all the resources (for both initial transmission and the subsequent repetitions) can be used to identify the HARQ process; and For a UE that can start at any of the configured resources, resources for the initial transmission can be used to identify the HARQ process ID. In addition, after the UE performs K repetition on the configured resources, the next resource is always corresponding to a different HARQ process ID. If the UE has another packet to transmit, it can immediately transmit the new packet using the next resources even if the previous HARQ process is still active. As the HARQ process ID associated with the next resource is different from the HARQ process ID associated with the previous active HARQ process.

Optionally, the mapping is also a function of a maximum number of HARQ processes.

Optionally, the HARQ process ID is based on a resource for the initial grant-free transmission in accordance with the mapping.

Optionally, the mapping maps the HARQ process ID to a plurality of resources, and the UE transmits the initial grant-free transmission using any one of the plurality of resources.

Optionally, the initial transmission is transmitted using a first multiple access signature pre-defined for initial UE transmissions.

Optionally, the mapping maps the HARQ process ID to a plurality K of resources including a first resource, and the UE transmits the initial grant-free transmission using the first resource.

Optionally, the mapping maps the HARQ process ID to a consecutive plurality of resources within an overall set of grant-free resources.

Optionally, each of the at least one resource is one of a plurality of grant free resources, wherein the plurality of grant free resources is periodically spaced in time.

According to another aspect of the present invention, there is provided a method in a base station, the method comprising: as part of a HARQ process having a HARQ process ID, receiving an initial grant-free transmission and K-1 repetitions, where K>=2; wherein a pre-defined mapping of the HARQ process ID to at least one resource available for grant-free transmission is a function of K.

Optionally, the mapping is also a function of a maximum number of HARQ processes.

Optionally, the HARQ process ID is based on a resource for the initial grant-free transmission in accordance with the mapping.

Optionally, the mapping maps the HARQ process ID to a plurality of resources, and the base station receives the initial grant-free transmission using any one of the plurality of resources.

Optionally, the initial transmission is received using a first multiple access signature pre-defined for initial UE transmissions.

Optionally, the mapping maps the HARQ process ID to a plurality K of resources including a first resource, and the base station receives the initial grant-free transmission using the first resource.

Optionally, the mapping maps the HARQ process ID to a consecutive plurality of resources within an overall set of grant-free resources.

Optionally, each of the at least one resource is one of a plurality of grant free resources, wherein the plurality of grant free resources is periodically spaced in time.

According to another aspect of the present invention, there is provided a UE comprising: a memory and at least one antenna; a grant-free transmission module configured to, as part of a HARQ process having a HARQ process ID, transmit an initial grant-free transmission and K-1 repetitions, where K>=2; wherein a pre-defined mapping of the HARQ process ID to at least one resource available for grant-free transmission is a function of K.

Optionally, the mapping is also a function of a maximum number of HARQ processes.

Optionally, the HARQ process ID is based on a resource for the initial grant-free transmission in accordance with the mapping.

Optionally, the mapping maps the HARQ process ID to a plurality of resources, and the UE transmits the initial grant-free transmission using any one of the plurality of resources.

Optionally, the initial transmission is transmitted using a first multiple access signature pre-defined for initial UE transmissions.

Optionally, mapping maps the HARQ process ID to a plurality K of resources including a first resource, and the UE transmits the initial grant-free transmission using the first resource.

Optionally, the mapping maps the HARQ process ID to a consecutive plurality of resources within an overall set of grant-free resources.

Optionally, each of the at least one resource is one of a plurality of grant free resources, wherein the plurality of grant free resources is periodically spaced in time.

According to another aspect of the present invention, there is provided a base station comprising: a memory and at least one antenna; a grant-free transmission module configured to, as part of a HARQ process having a HARQ process ID, receive an initial grant-free transmission and K-1 repetitions, where K>=2; wherein a pre-defined mapping of the HARQ process ID to at least one resource available for grant-free transmission is a function of K.

Optionally, the mapping is also a function of a maximum number of HARQ processes.

Optionally, the HARQ process ID is based on a resource for the initial grant-free transmission in accordance with the mapping.

Optionally, the mapping maps the HARQ process ID to a plurality of resources, and the base station receives the initial grant-free transmission using any one of the plurality of resources.

Optionally, the initial transmission is received using a first multiple access signature pre-defined for initial UE transmissions.

Optionally, the mapping maps the HARQ process ID to a plurality K of resources including a first resource, and the base station receives the initial grant-free transmission using the first resource.

Optionally, the mapping maps the HARQ process ID to a consecutive plurality of resources within an overall set of grant-free resources.

Optionally, each of the at least one resource is one of a plurality of grant free resources, wherein the plurality of grant free resources is periodically spaced in time.

In an embodiment, a method for communicating in a network is provided. The method includes receiving, by a user equipment (UE), a resource configuration from a base station for transmissions without dynamic grant which defines K resources for K transmissions of a transport block (TB) and transmitting, by the UE, an initial transmission without dynamic grant of the TB using a resource among the K resources that is not the beginning resource of the K resources. In one example, each of the K resources supports initial transmission of the TB without dynamic grant. In the same example, or another example, the method further includes transmitting, by the UE, a retransmission of the TB using a next available resource of the K resources. In any one of the preceding examples, or in another example, the resource configuration is received via radio resource control (RRC) signaling. In any one of the preceding examples, or in another example, the resource configuration is received via a combination of radio resource control (RRC) signaling and downlink control information (DCI) signaling. In any one of the preceding examples, or in another example, the K resources correspond to a same hybrid automatic repeat request (HARQ) process identifier (ID) for transmissions without dynamic grant. In such an example, the HARQ process ID may be determined based on the initial transmission. For instance, the HARQ process ID may be determined based on an index of a time unit where the resource used for the initial transmission is located, a periodicity, and a configured maximum number of HARQ processes. An apparatus (e.g., a user equipment (UE)) for performing this method is also provided.

In another embodiment, another method for communicating in a network is provided. This method includes transmitting, by a base station, a resource configuration to a user equipment (UE) for transmissions by the UE without dynamic grant from the base station. The resource configuration defines K resources for K transmissions of a transport block (TB). The method further includes receiving, by the base station, an initial transmission without dynamic grant of the TB using a resource among the K resources that is not a starting resource of the K resources. In one example, each of the K resources supports initial transmission of the TB without dynamic grant. In the same example, or another example, the method further includes receiving, by the base station, a retransmission of the TB using a next available resource of the K resources. In any one of the preceding examples, or in another example, the resource configuration is received via radio resource control (RRC) signaling. In any one of the preceding examples, or in another example, the resource configuration is received via a combination of radio resource control (RRC) signaling and downlink control information (DCI) signaling. In any one of the preceding examples, or in another example, the K resources correspond to a same hybrid automatic repeat request (HARQ) process identifier (ID) for transmissions without dynamic grant. In such an example, the HARQ process ID may be determined based on the initial transmission. For instance, the HARQ process ID may be determined based on an index of a time unit where the resource used for the initial transmission is located, a periodicity, and a configured maximum number of HARQ processes. A base station for performing this method is also provided. A system including the base station and UE is also provided.

BRIEF DESCRIPTION OF THE DRAWINGS

Embodiments of the disclosure will now be described with reference to the attached drawings in which:

FIG. 8 is a timing diagram showing an association between HARQ ID and slot index, according to one embodiment;

FIG. 9 is a timing diagram showing an association between HARQ ID and slot index, according to another embodiment;

FIG. 11 is a table showing a group downlink control information format, according to one embodiment;

FIG. 12 is a table showing a group downlink control information format, according to another embodiment;

FIG. 13 is a table showing a group downlink control information format, according to yet another embodiment;

FIG. 14 is a table showing a group downlink control information format, according to yet another embodiment;

FIG. 15 is a table showing a group downlink control information format, according to yet another embodiment;

FIG. 16 is a table showing a group downlink control information format, according to yet another embodiment;

FIG. 17 is a table showing a group downlink control information format, according to yet another embodiment;

FIG. 18 is a table showing an individual downlink control information format;

FIG. 23 is a format diagram showing multiple TBs per resource unit;

FIG. 24 is a format diagram showing multiple code blocks in a transport block; and FIG. 25 is a format diagram showing transmission of a new packet in previous packet's retransmission/repetition resource.

DETAILED DESCRIPTION

For illustrative purposes, specific example embodiments will now be explained in greater detail below in conjunction with the figures.

For UE configured with K repetitions for a transport block (TB) transmission with/without a grant, the UE can continue repetitions for the TB until one of the following conditions is met:

If an uplink (UL) grant is successfully received for a slot/mini-slot for the same TB;

the number of repetitions for that TB reaches K.

There is a lack of well-defined mechanisms that associate HARQ processes with resources for retransmission and for transmitting acknowledgements (ACKs) and negative acknowledgements (NACKs).

Figure 1:
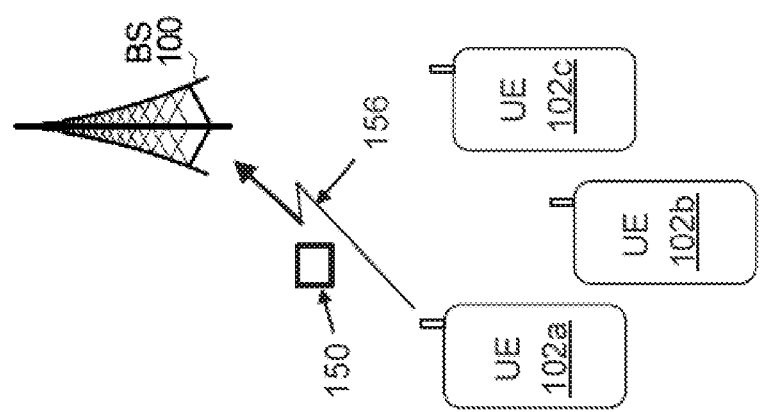
FIG. 1 is a block diagram of a base station and a plurality of UEs, according to one embodiment.

FIG. 1 is a block diagram of a base station (BS) 100 and a plurality of UEs 102a-c, according to one embodiment.

The word "base station" encompasses any device that wirelessly receives data in the uplink from UEs. Therefore, in some implementations, the base station 100 may be called other names, such as a transmit and receive point (TRP), a base transceiver station, a radio base station, a network node, a transmit/receive node, a Node B, an eNodeB (eNB), a gNB (sometimes called a "gigabit" Node B), a relay station, or a remote radio head. Also, in some embodiments, the parts of the base station 100 may be distributed. For example, some of the modules of the base station 100 may be located remote from the equipment housing the antennas of the base station 100, and may be coupled to the equipment housing the antennas over a communication link (not shown).

In operation, UEs 102a-c may each send grant-free uplink transmissions to the base station 100. A grant-free uplink transmission is an uplink transmission that is sent using uplink resources not specifically granted to the UE by the base station 100. A grant-free uplink transmission does not need a dynamic and explicit scheduling grant from the base station 100.

Grant-free uplink transmissions are sometimes called "grant-less", "schedule free", or "schedule-less" transmissions, or transmissions without grant. Grant-free uplink transmissions from different UEs 102a-c may be transmitted using the same designated resources, in which case the grant-free uplink transmissions are contention-based transmissions. Grant-free uplink transmissions may be suitable for transmitting bursty line traffic with short packets from the UEs 102a-c to the base station 100, and/or for transmitting data to the base station 100 in real-time or with low-latency. Examples of applications in which a grant-free uplink transmission scheme may be utilized include: massive machine type communication (m-MTC), ultra-reliable low latency communications (URLLC), smart electric meters, teleprotection in smart grids, and autonomous driving. However, grant-free uplink transmission schemes are not limited to these applications.

The uplink resources on which grant-free transmissions are sent will be referred to as "grant-free uplink resources". For example, the grant-free uplink resources may be a designated region in an OFDMA frame. The UEs 102a-c may use the designated region to send their grant-free uplink transmissions, but the base station 100 does not know which of the UEs 102a-c, if any, are going to send a grant-free uplink transmission in the designated region.

The grant-free uplink resources may be predefined, e.g. known in advance to both the UEs and the base station 100. The grant-free uplink resources may be static (never change), or the grant-free uplink resources may be configured semi-statically. A semi-static configuration means it is configured once and can only be updated/changed slowly, such as once in many frames or may only be updated as needed. A semi-static change differs from a dynamic change in that a semi-static change does not occur as often as a dynamic change. For example, a dynamic change/update may refer to a change every subframe or every few subframes, and a semi-static change may refer to a change that only occurs once every several OFDM frames, once every few seconds, or update only if needed.

In some embodiments, the grant-free uplink resources may be preconfigured, e.g. there may be a plurality of possible predefined grant-free uplink resource partitions, and the base station 100 or the network may semi-statically pick one of the predefined grant-free uplink resource partitions and signal to the UEs the grant-free uplink resource partition being used. In some embodiments, the base station 100 and/or the UEs may be configured during their manufacture to know which uplink resources to use as grant-free uplink resources, e.g. through predefined tables loaded during manufacture. In some embodiments, the grant-free uplink resources may be semi-statically configured, e.g. by using a combination of broadcast signalling, higher layer signalling (radio resource control (RRC) signalling) and dynamic signalling (e.g. downlink control information (DCI)) by the base station 100. By dynamically signaling the grant-free uplink resources, the base station 100 or network may adapt to the system traffic load of the UEs. For example, more grant-free uplink resources may be allocated when there are more UEs being served that may send grant-free uplink transmissions. In some embodiments, a control node (e.g. a computer) in the network may determine the grant-free uplink resources to be used. The network may then indicate the grant-free uplink resources to the base station and the UEs. In some embodiments, a UE operating in grant-free mode may be semi-statically configured to combine: 1) the RRC signaling information and the system information; or 2) the RRC signaling information and the DCI information; or 3) the RRC signaling information, the system information and the DCI information to determine an assigned transmission resource.

FIG. 1 illustrates a message 150 being sent by UE 102a in a grant-free uplink transmission over uplink channel 156. The message 150 is transmitted using a multiple access (MA) resource. A MA resource is comprised of a MA physical resource (e.g. a time-frequency block) and at least one MA signature. The MA signature may include (but is not limited to) at least one of the following: a codebook/codeword, a sequence, an interleaver and/or mapping pattern, a pilot, a demodulation reference signal (e.g. a reference signal for channel estimation), a preamble, a spatial-dimension, and a power-dimension. The term "pilot" refers to a signal that at least includes a reference signal, e.g. a demodulation reference signal. The reference signal may be the MA signature. In some embodiments, the pilot may include the demodulation reference signal, possibly along with a channel-estimation-oriented preamble, or a random access channel (LTE-like RACH) preamble.

In some embodiments, the uplink transmissions may use non-orthogonal multiple access (NOMA), such as: sparse code multiple access (SCMA), interleave-grid multiple access (IGMA), multi-user shared access (MUSA), low code rate spreading, frequency domain spreading, non-orthogonal coded multiple access (NCMA), pattern division multiple access (PDMA), resource spread multiple access (RSMA), low density spreading with signature vector extension (LDS-SVE), low code rate and signature based shared access (LSSA), non-orthogonal coded access (NOCA), interleave division multiple access (IDMA), repetition division multiple access (RDMA), or group orthogonal coded access (GOCA). Depending upon the multiple access method used, the MA signature may take different forms. The MA signature may relate to the specific format used for the multiple access method. For example, if SCMA is used, then the MA signature for the uplink transmission may be the SCMA codebook used for the uplink transmission. As another example, if IGMA is used, then the MA signature for the uplink transmission may be the IGMA's signature, interleaving pattern or grid mapping used for the uplink transmission.

Figure 2:
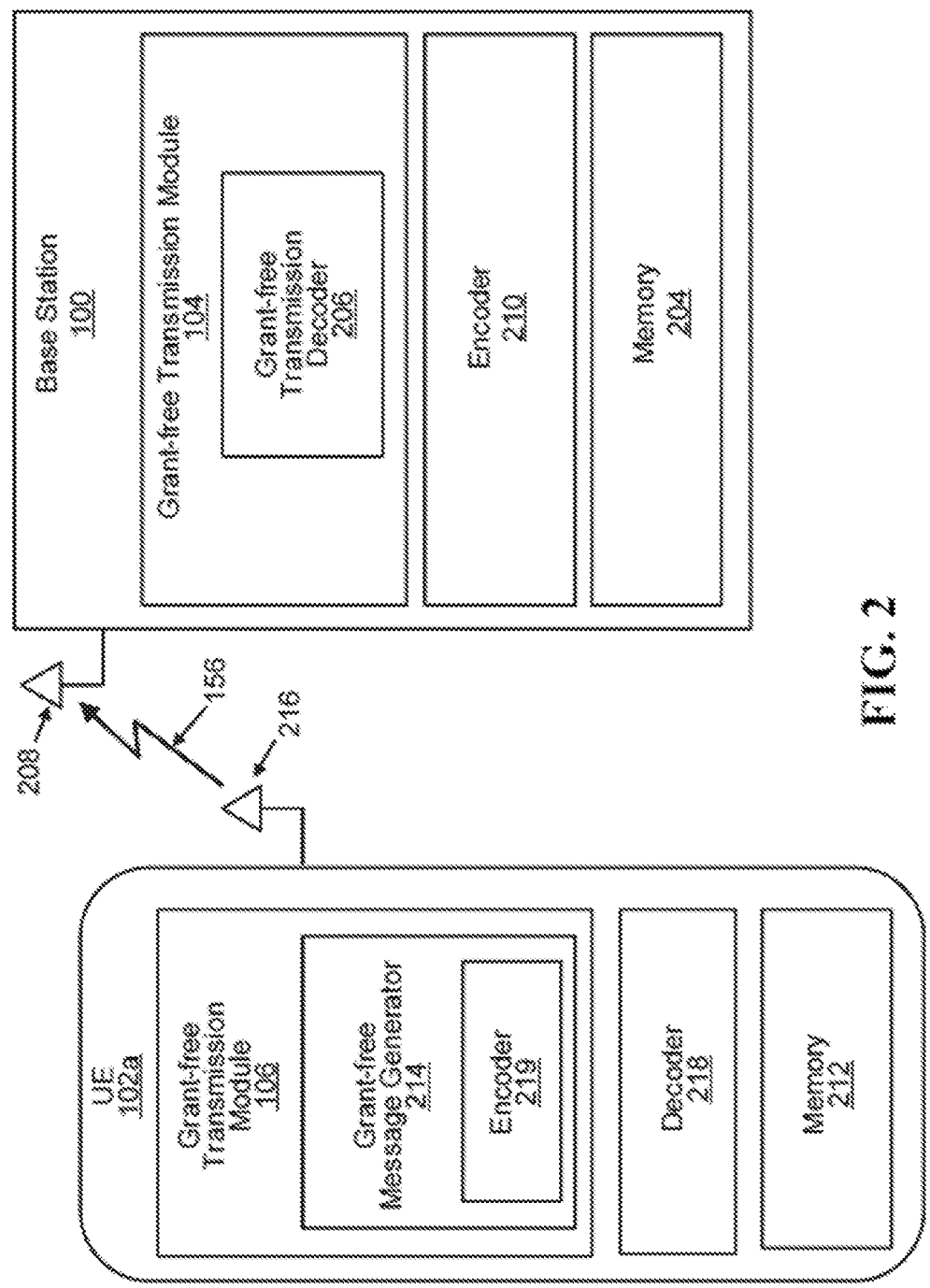
FIG. 2 is a block diagram showing a base station and UE in more detail, according to one embodiment.

FIG. 2 is a block diagram showing the base station 100 and UE 102a of FIG. 1 in more detail. The base station 100 includes a grant-free transmission module 104 for processing grant-free transmissions received from UEs 102a-c and for participating in the HARQ methods described herein relating to the received grant-free transmissions. For example, the grant-free transmission module 104 may include a grant-free transmission decoder 206. The base station further includes an encoder 210 for encoding information, such as downlink control information (DCI), destined for the UEs 102a-c. The base station 100 also includes one or more antennas 208 for receiving grant-free uplink transmissions from the UEs 102a-c and sending messages to the UEs 102a-c in the downlink. Only one antenna 208 is illustrated. The base station 100 further includes memory 204. The base station 100 further includes other components for operation, e.g. to implement the physical layer, but these have been omitted for the sake of clarity.

The grant-free transmission module 104 and its components (e.g. the grant-free transmission decoder 206), as well as the encoder 210, may be implemented by one or more processors hat execute instructions that cause the one or more processors to perform the operations of the encoder 210 and the grant-free transmission module 104 and its components. Alternatively, the encoder 210 and the grant-free transmission module 104 and its components may be implemented using dedicated integrated circuitry, such as an application specific integrated circuit (ASIC), a graphics processing unit (GPU), or a programmed field programmable gate array (FPGA) for performing the operations of the encoder 210 and the grant-free transmission module 104 and its components.

The UE 102a also includes a complementary grant-free transmission module 106 for generating and sending grant-free messages and for participating in the HARQ methods described herein related to the grant-free messages. For example, the grant-free transmission module 106 includes a grant-free message generator 214 for generating messages to be transmitted in grant-free uplink transmissions. Generating a grant-free message may include encoding, in encoder 219, the data to be transmitted in the message, and modulating the encoded data. The UE 102a further includes a decoder 218 for decoding information from the base station 100, e.g. for decoding DCI that was encoded by encoder 210. The UE 102a further includes one or more antennas 216 for transmitting grant-free uplink transmissions and receiving messages from the base station 100 in the downlink. Only one antenna 216 is illustrated. The UE 102a further includes memory 212. The UE 102a further includes other components for operation, e.g. to implement the physical layer, but these have been omitted for the sake of clarity.

The grant-free transmission module 106 and its components (e.g. the grant-free message generator 214), as well as the decoder 218, may be implemented by one or more processors that execute instructions that cause the one or more processors to perform the operations of the decoder 218 and the grant-free transmission module 106 and its components. Alternatively, the decoder 218 and the grant-free transmission module 106 and its components may be implemented using dedicated integrated circuitry, such as an ASIC, GPU, or a programmed FPGA for performing the operations of the decoder 218 and the grant-free transmission module 106 and its components.

Example Message Formats for Grant-Free Uplink Transmissions

Figure 3:
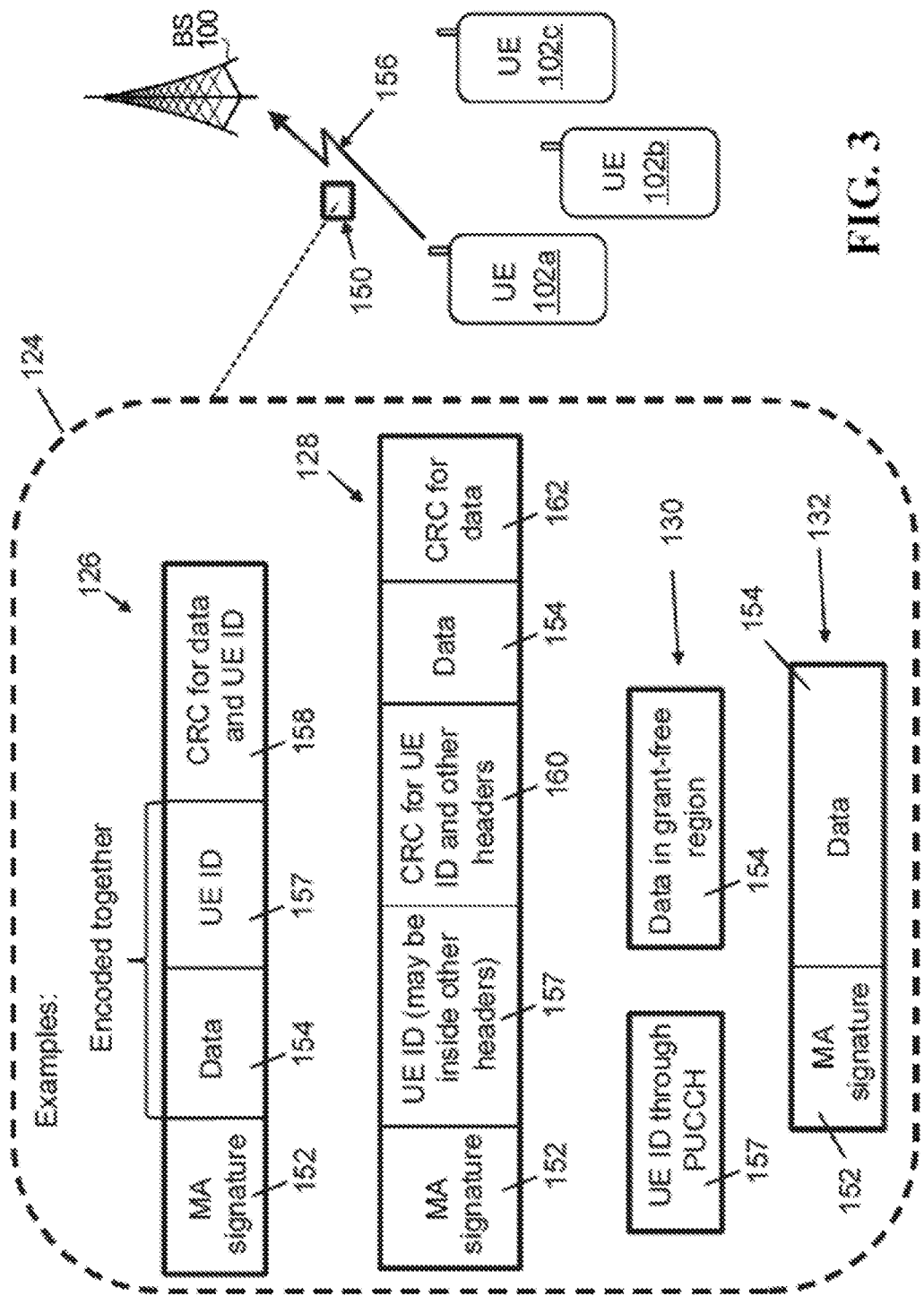
FIG. 3 is a format diagram illustrating example formats for a grant-free uplink transmission.

FIG. 3 illustrates example formats for the message 150 sent by UE 102a in the grant-free uplink transmission of FIG. 1. The example formats are shown in stippled bubble 124.

In example 126, the message 150 includes a MA signature 152, as well as data 154 and a UE ID 157. The UE ID 157 is information used by the base station 100 to identify the UE. In example 126, the data 154 and the UE ID 157 are encoded together, and a corresponding cyclic redundancy check (CRC) 158 is generated and included in the message 150. In some embodiments, the UE ID 157 is instead embedded (e.g. scrambled) in the CRC 158, which may reduce the payload size. If the UE ID 157 is embedded in the CRC 158, then the base station 100 needs to know the UE ID or perform blind detection using all potential UE ID's in order to decode the CRC 158.

Example 128 is a variation of example 126 in which the UE ID 157 is separately encoded from the data 154. Therefore, a separate CRC 160 is associated with the UE ID 157. In some embodiments, the UE ID 157 may be inside one or more other headers, in which case the CRC 160 is for the headers in which the CRC 160 is located. A separate CRC for data 162 is included in example 128. In example 128, the UE ID 157 may be transmitted with a lower modulation and coding scheme (MCS) than the data 154 in order to facilitate decoding of the UE ID 157. There may be situations in which the UE ID 157 is successfully decoded, but the data 154 is not successfully decoded.

In examples 126 and 128, the MA signature 152 is illustrated as occupying separate time-frequency resources from the data 154, e.g. at the start of the message 150. This may be the case if, for example, the MA signature 152 consists of a reference signal and/or a preamble. However, the MA signature 152 may instead be part of the transmission scheme itself, e.g. the codebook used or the mapping or interleaving pattern used, in which case the MA signature 152 would not occupy separate time-frequency resources from the data 154. Also, in embodiments in which the MA signature 152 does occupy separate time-frequency resources from the data 154, the resources do not necessarily have to be at the start of the message 150.

Example 130 in FIG. 3 shows a variation in which the UE ID 157 and the data 154 are transmitted through different resources. For example, the UE ID 157 may be transmitted as part of a control channel, such as a physical uplink control channel (PUCCH). The data 154 may be transmitted in a grant-free region of an uplink data channel. The MA signature is not illustrated in example 130, but the MA signature would be part of the data transmission.

In some other embodiments, the UE ID is not explicitly transmitted. For example, in some URLLC scenarios, based on the resource and reference signal configuration, detecting the reference signal along with the information about the grant-free resources may be enough to identify the UE. In this case, the UE ID does not need to be explicitly transmitted, and the base station can identify the UE after successfully detecting the reference signal. An example is shown at 132. Only the MA signature 152 and the data 154 are included in the message, not a UE ID. The UE ID can be determined based on the MA signature 152 and the grant-free uplink resources used to send the message.

When the UE sends message 150 to the base station 100, the base station 100 first attempts to detect the MA signature. MA signature detection may involve a blind detection process in which the MA signature is detected among all of the possible choices of MA signatures. Detecting the MA signature is referred to as activity detection. As an example, the MA signature in the grant-free uplink transmission may be a reference signal, and activity detection by the base station would therefore comprise detecting the reference signal in the grant-free uplink transmission. As another example, the MA signature in the grant-free uplink transmission may be a combination of the reference signal and the codebook or signature used by the UE in the grant-free uplink transmission, and activity detection by the base station would therefore comprise detecting the combination of the reference signal and codebook/signature used in the grant-free uplink transmission.

By successfully performing activity detection, the base station 100 knows that a UE has sent a grant-free uplink transmission. However, successful activity detection may or may not reveal the identity of the UE to the base station 100. If there is a unique mapping between a UE and an MA signature (e.g. for a given MA physical resource each UE has been assigned to use a different MA signature), then successful activity detection reveals the identity of the UE that sent the grant-free uplink transmission. Otherwise, in general, successful activity detection does not reveal the identity of the UE that sent the grant-free uplink transmission, although it may reveal that the UE is from a particular group of UEs, if different groups of UEs are assigned different MA signatures. In some embodiments, activity detection may further include obtaining the UE ID, e.g. if the UE ID is encoded separately from the data 154, as in example message 128.

After activity detection is successful, the base station 100 then attempts to perform channel estimation based on the MA signature and optionally additional reference signals multiplexed with the data message, and then decode the data 154. If data decoding is also successful, then the base station 100 can send an acknowledgement (ACK) to the UE in the downlink indicating that the base station 100 has successfully decoded the data 154. In embodiments in which successful activity detection does not reveal the identity of the UE, then successful decoding of the rest of the message 150 will reveal the identity of the UE, in which case the base station 100 will know the UE to which to send the ACK. If data decoding is not successful, then a negative acknowledgement (NACK) may be sent by the base station, possibly with a grant for a retransmission. As discussed in more detail later, in some embodiments a NACK is not sent if decoding of the data was unsuccessful. As also discussed in more detail later, in some embodiments, if a NACK is sent, the NACK may not necessarily include information that can uniquely identify the UE to which the NACK is being sent because the base station may not be able to uniquely identify the UE.

In one example, the MA signature 152 in example 126 is a reference signal. The base station 100 may first successfully perform activity detection by successfully decoding the reference signal sequence. The reference signal sequence may then be used by the base station 100 for channel estimation of the uplink channel 156. To facilitate successful decoding of the reference signal, the reference signal may be transmitted with a low MCS. Once the reference signal is successfully decoded and channel estimation performed, the base station 100 then decodes the payload having the data 154 and UE ID 157. The base station 100 can then read the UE ID 157 to be informed of which UE the grant-free transmission came from. The base station 100 can then send an ACK to the UE in the downlink indicating that the base station 100 has successfully decoded the data 154.

HARQ for Grant-Free Uplink Transmissions

HARQ may be performed for the grant-free uplink transmissions. For example, if the data 154 in the initial grant-free uplink transmission is not successfully decoded by the base station 100, then a retransmission may be performed by the UE. The retransmission may include a retransmission of the initial data and/or further information for decoding the initial data. For example, the retransmission data may include some or all of the original data and/or parity information. The base station 100 may perform HARQ combining as follows: instead of discarding unsuccessfully decoded initial data, the unsuccessfully decoded initial data may be stored at the base station 100 in memory and combined with received retransmission data to try to successfully decode the initial data. When HARQ combining is performed, the retransmission data from the UE may not need to be a complete retransmission of the initial data. The retransmission may carry less data, such as some or all of the parity bits associated with the initial data. One type of HARQ combining that may be used is soft combining, such as chase combining or incremental redundancy.

Initial transmissions and retransmissions may use different redundancy versions (RVs). When data is encoded in the grant-free message generator 214, the encoded bits may be partitioned into different sets (that possibly overlap with each other). Each set is a different RV. For example, some RVs may have more parity bits than other RVs. Each RV is identified by an RV index (e.g. RV 0, RV 1, RV 2, . . . etc.). When an uplink transmission is sent using a particular RV, then only the encoded bits corresponding to that RV are transmitted. Different channel codes may be used to generate the encoded bits, e.g. turbo codes, low-density parity-check (LDPC) codes, polar codes, etc. An error control coder (not illustrated) in the grant-free message generator 214 in the UE 102a may perform the channel coding.

In one embodiment, the channel coding results in an encoded bit stream comprising three bit streams: a systematic bit stream and two parity bit streams. Rate matching may be performed, and a circular buffer (not illustrated) may store the systematic and parity bits. The bits may be read from the circular buffer and modulated for transmission in the grant-free uplink message. The circular buffer has different RVs associated with it, e.g. four redundancy versions (RVs): RV0, RV1, RV2, and RV3. Each RV indicates a starting location from which the coded bits are to be read from the circular buffer. Therefore, each RV transmits a different set of the encoded bits. Data may initially be transmitted using RV 0, but a retransmission may sometimes use a higher RV, e.g., RV 2 for the first retransmission, RV 3 for a second retransmission, etc.

The base station 100 uses knowledge of the RV to perform decoding. For chase combining, the RV of the initial and retransmissions may be the same, e.g. RV0. For incremental redundancy, the retransmissions may use a higher RV that may follow a fixed pattern, e.g. RV0 for the initial transmission, RV 2 for the first retransmission, RV 3 for the second retransmission, and RV 1 for the third retransmission. Therefore, in order to decode the data, it may be necessary for the base station 100 to know the RV index of the data being received in a grant-free uplink transmission, unless there is only one predefined RV.

As part of the HARQ procedure for a grant-free uplink transmission, an ACK may be sent by the base station 100 when the base station 100 successfully decodes the data of the grant-free uplink transmission. In some embodiments, a NACK may be sent by the base station 100 when the data is not successfully decoded. However, a NACK may not always be sent, e.g. in "NACK-less" HARQ schemes in which the absence of an ACK within a predetermined period of time is interpreted as a NACK. In some embodiments, an ACK may be associated with a UE ID that identifies the UE the ACK is meant for. Examples are described below of how ACK/NACKS are associated with specific GF transmissions.

Signaling ACK/NACK

There are many different possibilities for signaling an ACK or a NACK (when used) to a UE that has sent a grant-free uplink transmission. Different options are described below. A combination of two or more of the options described below may be used. Also, some of the options described below assume that the base station has first uniquely identified the UE that sent the grant-free uplink transmission. Different ways in which the UE may be uniquely identified include, for example using the UE ID (which may be an index), or using the UE ID in combination with other information, such as the grant-free uplink resource used, or using the MA signature in combination with the grant-free uplink resource used, etc.

In some embodiments, the base station 100 may transmit ACKs and/or NACKs for grant-free uplink transmissions on a dedicated downlink acknowledgement channel. In some embodiments, the dedicated downlink acknowledgement channel may be implemented in a similar way to the physical HARQ indicator channel (PHICH) in LTE, in which case the dedicated downlink acknowledgment channel may be called a "PHICH-like" channel.

In some embodiments, the feedback timing on the dedicated downlink acknowledgement channel has a fixed relationship with the grant-free resource access timing. For example, if a UE sends a grant-free uplink transmission in subframe (or transmission time interval (TTI))w, then the ACK/NACK for that grant-free uplink transmission is sent on the dedicated downlink acknowledgement channel in subframe (or TTI)w+k. Ideally k is small, e.g. k=2. For example, if the UE is to automatically send retransmissions until an ACK is received, then having k be a small value will hopefully result in earlier termination of the automatic retransmissions. In some embodiments, the value of k is predefined and known to the UE and the base station. For example, the value of k may be configured in the system information. In some other embodiments, the value of k may be configured for each UE or UE group, and the configuration may be done through signalling, e.g. RRC signalling.

Figure 4:
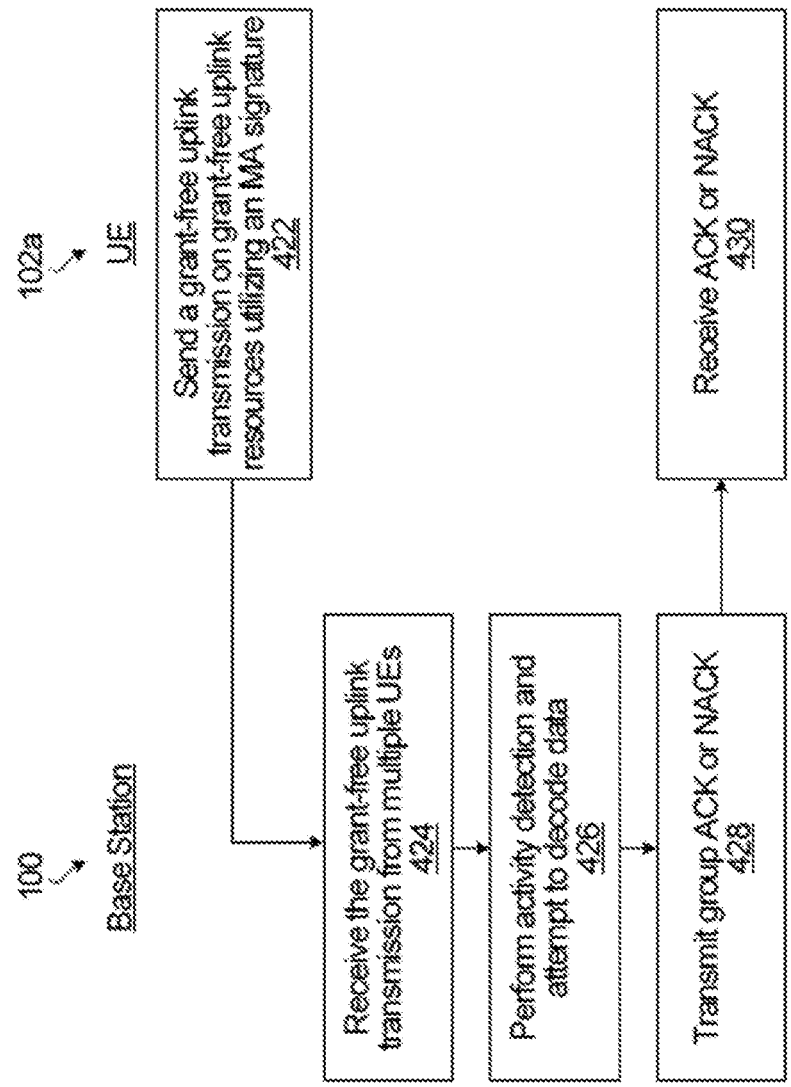
FIG. 4 is a flowchart of a method performed by a UE and base station, according to one embodiment.

FIG. 4 is a method performed by base station 100 and UE 102a, according to one embodiment. In step 422, the UE 102a transmits a grant-free uplink transmission to the base station 100 on grant-free uplink resources. Multiple UEs perform this step, on grant free resources defined using one of the method described in detail below. The grant-free uplink transmission utilizes an MA signature. In step 424, the base station 100 receives the grant-free uplink transmission. In step 426, the base station performs activity detection to obtain the MA signature, and then attempts to decode data in the grant-free uplink transmission. In step 428, the base station 100 transmits, feedback relating to the grant-free uplink transmission comprising a group ACK or a NACK, using one of the ACK/NACK methods described in detail below. In step 430, the ACK or NACK is received by UE 102a.

In some embodiments, the base station 100 may transmit ACKs and/or NACKs for grant-free uplink transmissions for each individual UE. In some embodiments, the ACK/NACK feedback for an individual UE may be transmitted through downlink control information (DCI). Multiple DCIs would be transmitted separately when ACK/NACK feedback is being transmitted to multiple UEs, i.e. each UE would have its own individual DCI.

Figure 5:
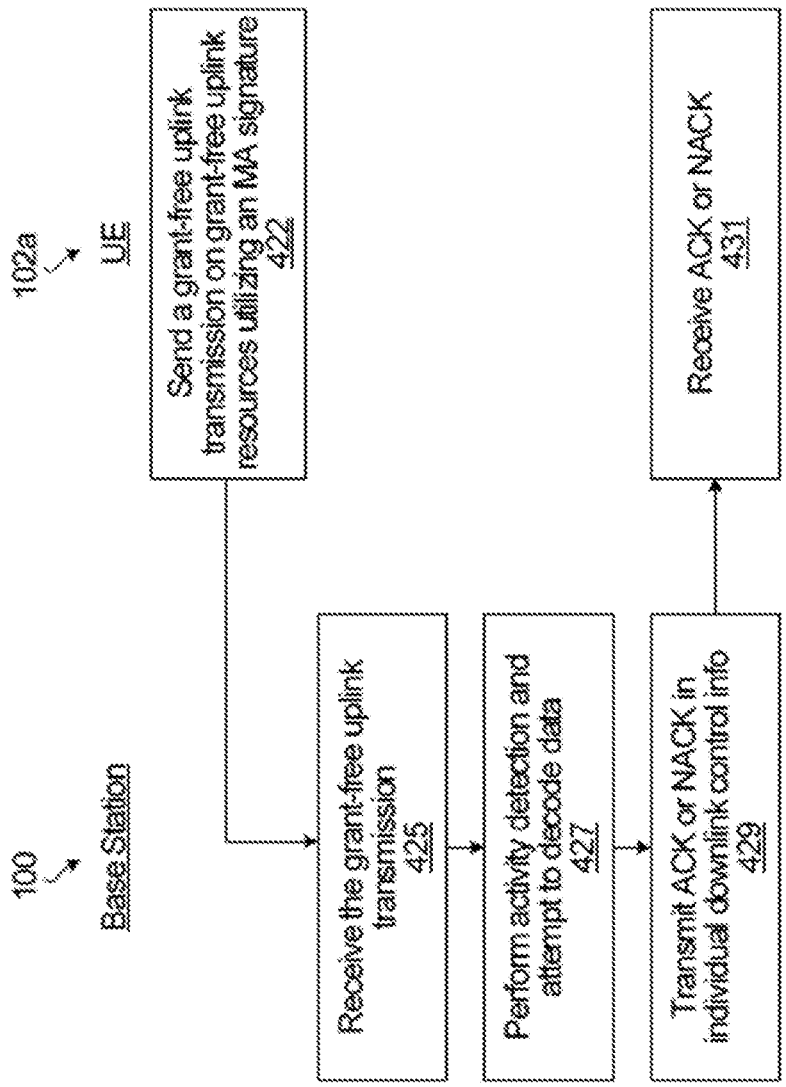
FIG. 5 is a flowchart of a method performed by a UE and base station, according to another embodiment.

FIG. 5 illustrates a method performed by base station 100 and UE 102a, according to another embodiment. In step 422, the UE 102a transmits a grant-free uplink transmission to the base station 100 on grant-free uplink resources. The grant-free uplink transmission utilizes an MA signature. In step 425, the base station 100 receives the grant-free uplink transmission. In step 427, the base station performs activity detection to obtain the MA signature, and then attempts to decode data in the grant-free uplink transmission. If the data is decoded, then the base station 100 can obtain the UE ID (e.g. RNTI) of the UE 102a. In step 429, the base station 100 transmits, in individual downlink control information, feedback relating to the grant-free uplink transmission comprising an ACK or a NACK. If an ACK is sent, the base station 100 masks the feedback using the UE ID, e.g. by scrambling the CRC of the feedback with the UE ID. If a NACK is sent, the base station 100 only masks the feedback using the UE ID if the UE ID is known by the base station, e.g. if the MA signature uniquely identifies UE 102a on the grant-free uplink resources. In step 431, the ACK or NACK is received by UE 102a, e.g. if the CRC is scrambled with the ID of UE 102a, then the UE 102a receives the ACK or NACK by unscrambling the CRC using the ID of UE 102a.

For example, the ACK or NACK for a particular UE may be included in DCI for that UE that has a CRC field which is masked with the UE ID. The UE ID may be the RNTI for the UE (e.g. the cell RNTI (C_RNTI)), although this is not a necessity. If the UE ID is the RNTI for the UE, then the RNTI may be signalled through the RRC channel. The DCI may be transmitted at a location within the search space defined by the UE ID (e.g. defined by the C_RNTI). When monitoring the potential DCI command, the UE may attempt to decode all the possible locations of DCIs within its search space. If the CRC checks with the assigned UE ID, then the control channel is declared as valid and the UE processes the information inside the DCI.

The search space location in the control channel (DCI) may be defined for UEs operating in grant-free mode. In some embodiments, the search space location may be indicated by the index of potential CCEs (control channel elements) in each subframe/TTI. The index may have a predefined relationship derived from the grant free UE ID (such as the C_RNTI) or the grant free group ID (such as a group_RNTI) assigned to the UE. This method is similar to the definition of PDCCH search space in LTE.

To support multiple HARQ processes for GF transmission, the base station needs to identify different HARQ processes used for the GF transmission in order to do HARQ combining or to indicate which HARQ process (or transport block (TB)) it is responding to. There are different ways to identify the different HARQ processes. If the HARQ feedback or grant sent by the BS has a fixed timing relationship and if there is only maximum one HARQ process (TB) per time slot, the HARQ feedback or grant can identify the HARQ process through a fixed timing relationship. This is usually used for synchronous HARQ. For example, if the transmission is at time slot n and the HARQ ACK/NACK or a grant for this HARQ is happened at fixed time slot n+4, which is known by both UE and BS, the HARQ feedback can rely on the timing to identify which HARQ process or TB it is ACK/NACK or grant to.

Another way to identify the HARQ process is to have a known mapping relationship between HARQ process and GF transmission resources. The mapping relationship can be configured and explicitly signalled. The mapping relationship can also be predefined, i.e., based on some predefined relationship known to both UE and base station, but does not need to be explicitly signalled. In the HARQ response (including ACK/NACK or a grant), the BS can explicitly or implicitly include the HARQ process ID (or number). This can be applied in asynchronous HARQ where there may or may not have a fixed timing relationship between transmission and the HARQ response.

Another way to identify the HARQ process is for the UE to explicitly or implicitly indicate the HARQ process ID in GF transmission.

Configuration of a Multiple GF Resource Sets for Different HARQ Process, Identification and Indication Based on GF Resource Index for HARQ Response/Grant.

A first set of embodiments relates to systems and methods for configuring multiple GF resources sets that enable multiple HARQ processes, where each set of GF resource (GF resource set) may be configured to have a predefined mapping to a HARQ process. An important example and a special case for this set of embodiments is to have parallel HARQ within a time unit, i.e., there may be GF resources within a time unit to be assigned to the same UE, each GF resource may correspond to a different HARQ process. Throughout the disclosure, a time unit can refer to a TTI, a time slot, a slot, a subframe, a frame, a mini-slot or any predefined time unit. With this configuration of multiple HARQ, each GF resource set can be used for a respective process including an initial transmission and transmissions. The resource sets may occupy differing frequency bands or code spaces for example.

In some embodiment, within each of the GF resource sets, a UE transmits a new packet and retransmissions according to a given retransmission protocol, and the GF resource set is not used for another new packet until the previous packet has been acknowledged, or a maximum repetition number is achieved.

Figure 6:
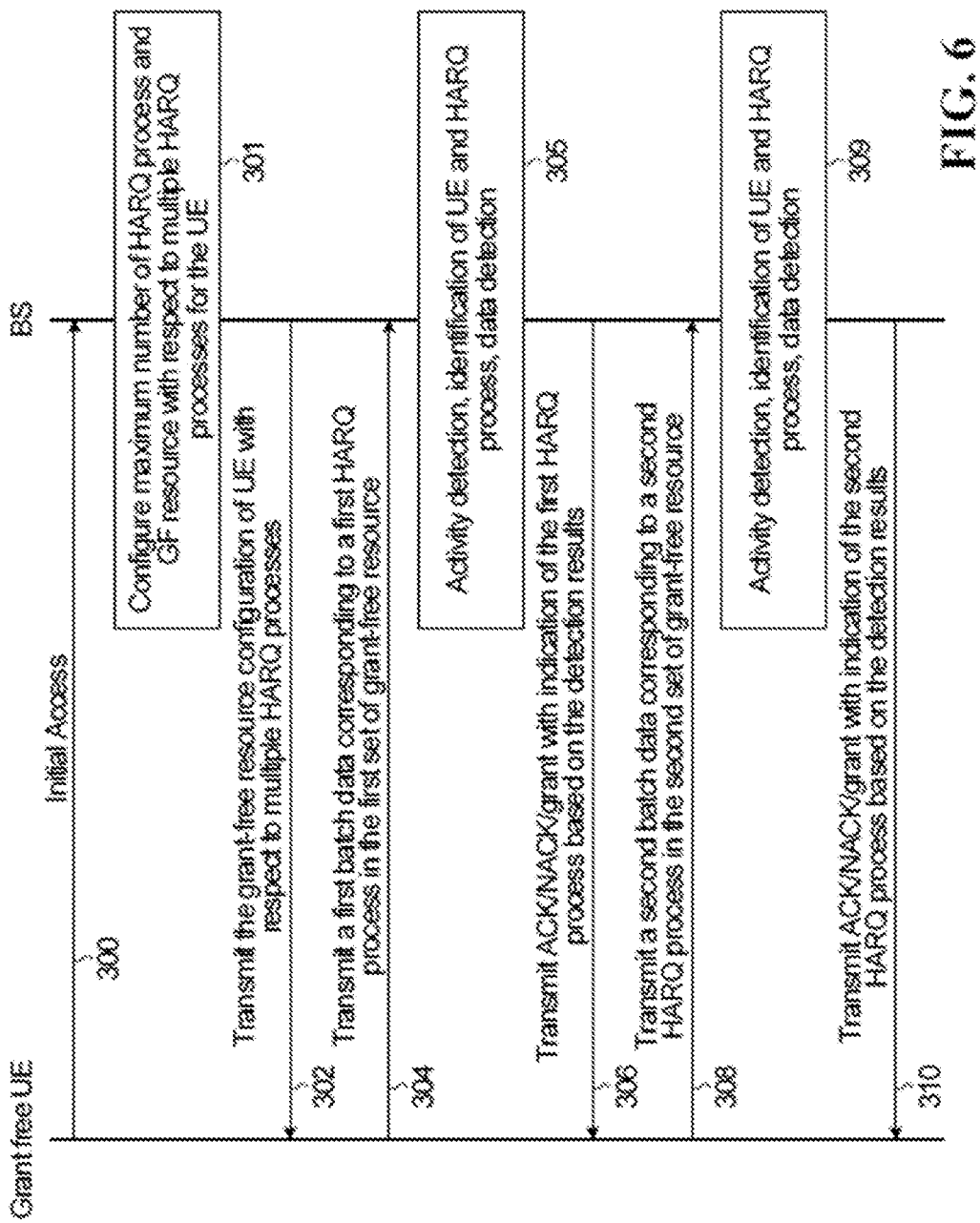
FIG. 6 is a timing diagram showing a communication between a base station and a UE for multiple HARQ identification in GF transmission.

FIG. 6 shows an example procedure between a base station (BS) and a UE for multiple HARQ identification in GF transmission. After initial access 300, at 301 the BS configures a maximum number of HARQ processes and GF resources with respect to the multiple HARQ processes for the UE. At 302, the BS transmits the grant-free resource configuration of the UE with respect to multiple HARQ processes. At 304, the UE transmits a first batch data corresponding to a first HARQ process in the first set of grant-free resources, also referred to herein as a first transport block (TB). At 305, the BS performs activity detection, and identification of the UE and HARQ process followed by data detection. At 306 the BS transmits an acknowledgement, a negative acknowledgement or a grant (ACK/NACK/grant) with an indication of the first HARQ process based on the detection result. Steps 308,309,310 are the same as steps 304,305,306, but for a second batch of data corresponding to a second HARQ process in a second set of grant-free resources. Steps 308,309,310 can occur in parallel with steps 304,305,306.

In a specific example, at 305, the BS performs activity detection to identify a multiple access (MA) signature (e.g. a reference signal). In some embodiments, the MA signature along with the GF resources location may identify the UE along with the corresponding HARQ number (according to the configuration or predefined rule). For example, if the resource has a predefined mapping with the HARQ process, the BS can identify the HARQ process.

In a first embodiment, the network explicitly configures resources corresponding to the multiple HARQ processes. In some embodiments this configuration is only for initial transmissions. Alternatively, this configuration is for both initial transmissions and retransmissions. In some embodiments, the network configures multiple HARQ processes and other associated parameter components, including one or more sub-bands with mixed numerologies or single numerology, slots and mini-slots, etc., and updates these configurations semi-statically and/or dynamically. In other embodiments, the design for the HARQ feedback or acknowledgement messages may consider the component configurations for, e.g., one or more sub-bands with mixed numerologies or single numerology, slots and mini-slots, etc.

In a second embodiment, the network configures resources for each UE for multiple HARQ processes without specifying the corresponding HARQ process number. In this case, there may be a rule, known both to the UE and the network, that associates resources with HARQ processes.

In some cases (for the first or second embodiment described above) the configuration is performed using higher layer signaling such as radio resource control (RRC) signaling or using dynamic signaling, such as a downlink control channel or downlink control indicator (DCI). The configuration may be semi-statically defined.

In some cases (for the first or second embodiment described above) the configuration is performed using a combination of at least a broadcast signaling (e.g. in system information) and/or high layer signaling (e.g. RRC) or using a combination of at least broadcast signaling, high layer signaling (e.g. RRC) and/or a downlink control channel such as DCI.

The following is a specific example of multiple HARQ grant free resource configuration using only higher layer signaling, such as RRC. The signaling includes the following fields:

Optionally, an indication of the maximum number of HARQ processes: numberOfConfUlGF-Processes L;

A user identifier, e.g., a radio network temporary identifier (RNTI): GF-RNTI (grant-free Radio Network Temporary Identifier) or C-RNTI (cell-RNTI) or both. The RNTI may be used for further control signalling with respect to this user. E.g., the RNTI can be used to define the search space and scramble the CRC for downlink control signal through a downlink control indicator (DCI) transmitted to this UE; and Resource indications for each of the HARQ processes:
Time and frequency resource set for HARQ process index 0
Time and frequency resource set for HARQ process index 1
. . .
Time and frequency resource set for HARQ process index L−1.

In some embodiments, the time and frequency resource set corresponds to parallel HARQ where multiple GF resources are configured for each time unit. Each GF resource corresponds to a different HARQ process for the same time unit. In some cases, the time and frequency index can be indicated as a sequence of frequency location indexes of GF resources at different time units. One UE may be assigned multiple sequences, with each sequence corresponding to a different HARQ process.

In some embodiments, the resource indications for each of the HARQ processes include a HARQ process ID/number. In other embodiments, the HARQ process ID/number is not explicitly indicated in the configuration, and only multiple sets of resources are configured. In this case, there may be a predefined rule that maps HARQ processes to the configured resources. E.g., if two sets of resources are configured, then the first set may corresponding to HARQ process number 0, the second set may correspond to HARQ process number 1. As another example, if two parallel sets of resources are configured such that within one time unit/slot, there are two GF resources in different frequency locations, the one with higher frequency band index may be corresponding to HARQ process 0, the other is then corresponding to HARQ process 1 or vice versa.

The following is a specific example of multiple HARQ grant free resource configuration using higher layer signaling, such as RRC, in combination with downlink control channel, such as DCI. The signaling includes the following fields in high layer signaling (e.g. RRC):

Optionally, an indication of the maximum number of HARQ processes: numberOfConfUlGF-Processes L; and A user identifier (RNTI): GF-RNTI or C-RNTI.

The signaling includes the following fields in the downlink control channel:

DCI activation of $1^{st}$ HARQ process. The DCI may have a search space defined and CRC scrambled by GF-RNTI or C-RNTI, which is configured in high layer signalling;

Resource assignment, including for example new data indicator (NDI), and/or modulation and coding scheme (MCS) and/or other fields that is typical in a DCI format for grant an UL transmission;

An index of reference signal (RS), e.g. a cyclic shift of reference signal (RS) or combination of cyclic shift of orthogonal cover codes (OCC) index; and May or may not include a field that explicitly indicates the HARQ process ID/number.

The DCI activation may work similarly to DCI activation used in LTE semi-persistent scheduling (SPS), where a UE can perform GF transmission after DCI activation. The format may be similar to LTE SPS DCI activation format. But there may be an addition of HARQ process number.

DCI activation of $2^{nd}$ through $L^{th}$ HARQ process follows the same format. The DCI activation of different HARQ processes may contain a different HARQ process ID.

If HARQ a process ID is not explicitly included in the DCI activation, the process ID, in some embodiments the HARQ process is derived based on one or combination of:

the time order of DCI activation; and the order of the resource block frequency location.

In some embodiments, higher layer signaling, such as RRC, is used to convey multiple HARQ GF resources configuration for group DCI that carries group ACK/NACK. The following is a specific example:

Optionally, an indication of the maximum number of HARQ processes: numberOfConfUlGF-Processes L; and A UE identifier for the group, the identifier may be used to define the search space and scramble the CRC for group DCI sent to the UEs configured in this group. The group DCI can be used to convey a group ACK/NACK of GF transmission of multiple UEs in this group: Group-GF-RNTI.

The signaling may include a UE index within group, for example where there are 10 UEs, each might have an index between 1 and 10. The index is associated with a specific location for the ACK/NACK for the UE associated with the index.

Alternatively, the signaling may include UE position index for different HARQ processes instead of a UE index. In this case, the signaling indicates where the ACK/NACK is located for each HARQ process. A UE, with knowledge of the HARQ processes assigned to it, can then find its ACK/NACK. In this case, each UE may have multiple UE ACK/NACK indexes corresponding to different HARQ process, while different UEs may have different UE ACK/NACK indexes. The signaling may take the following form:

UE ACK/NACK index for HARQ process 0
UE ACK/NACK index for HARQ process 1
UE ACK/NACK index for HARQ process L−1

In some embodiments, DCI is used to configure for the group ACK/NACK resources for each HARQ process with corresponding resource assignment. Alternatively this can be done using higher layer signaling, such as RRC.

Predefined Relationship Between GF Resources and HARQ Process

In some embodiments, there is a predefined relationship established between HARQ process ID of grant free resources for GF transmission. In some embodiments, the predefined relationship is only between HARQ process ID and GF initial transmission. In some embodiment, the predefined relationship is between HARQ process ID and GF transmission, including GF initial transmission and GF retransmission or repetition.

In ACK/NACK response, the HARQ process ID can be included, for example when the predefined relationship is established between HARQ process ID of grant free resources for GF initial transmission only. Resources for retransmission may be configured separately or may rely on grant-based resource allocation which is associated with the HARQ ID or HARQ process number of the grant. In some embodiments, the HARQ ID is also associated with retransmission resource, unless a grant-based retransmission is done.

In some embodiments, the HARQ process resource association is cyclic such that the HARQ ID is associated with sequential resource cycles through the HARQ ID. In other embodiment, the HARQ process resource association associates K resources in a row for a given HARQ process before switching to the next HARQ process, allowing for a repetition factor of K.

The following discusses how to set the relationship between HARQ process ID and resources to be predefined based rules known by both the BS and UE. In some embodiment, the HARQ process resource association is cyclic such that the HARQ ID is associated with sequential resources cycles through the HARQ ID. In a first example, if there is at most one GF resource per TTI, the HARQ process ID for an initial transmission and a specific GF resource is derived as follows:

HARQ Process ID=floor(CURRENT_TTI/GFAccessIntervalUL) modulo numberOfConfUlGF-Processes, In a second example, if there are multiple parallel resources at each TTI, the association may be defined by HARQ Process ID=(floor(CURRENT_TTI/GFAccessIntervalUL)*NumGFResourceperTTI+GFresourceIndexWithinTTI) modulo numberOfConfUlGF-Processes Where:

CURRENT_TTI is a number/index of a current TTI, note TTI can be replace by any time unit, i.e, the index of the time unit.

GFAccessIntervalUL is the number of TTIs (or periodicity) between two adjacent GF resources in time domain, it can be configured in higher layer signalling (e.g. in RRC). For example, if the UE is configured to be having one GF resources every 3 TTI, then GFAccessIntervalUL is 3. The TTI can also be replaced by any time unit, but should be consistent with the Current_TTI field.

NumGFResourceperTTI is the number of GF resources per TTI (more generally per time unit). For example, if there are two GF resources in different frequency locations configured every 3 TTI where the two set of GF resources are located at different frequency location but the same TTI. Then umGFResourceperTTi=2 and GFAccessIntervalUL=3.

GFresourceIndexWithinTTI is an index of the specific GF resource within a TTI (or general a time unit). For example, if there are two GF resources configured per TTI, one resource with larger frequency location may correspond to GFresourceIndexWithinTTI=0, the other correspond to GFresourceIndexWithinTTI=1 or vice versa.

numberOfConfUlGF-Processes is the number of configured maximum HARQ processes for the UE as described earlier in higher layer signalling.

In some instances, the number of GF resources per time unit is one in which case the index GFresourceIndexwithinTTI is 0, although other indexing schemes can be used.

The first example corresponds to cycling the HARQ process sequentially through GF resources in time when there is only a maximum of one GF resource per time unit for a UE. The second example corresponds to cycling the HARQ process through GF resources sequentially in the order of frequency location first, then time location if there are multiple GF resources configured for each UE in the same time unit.

Figure 7:
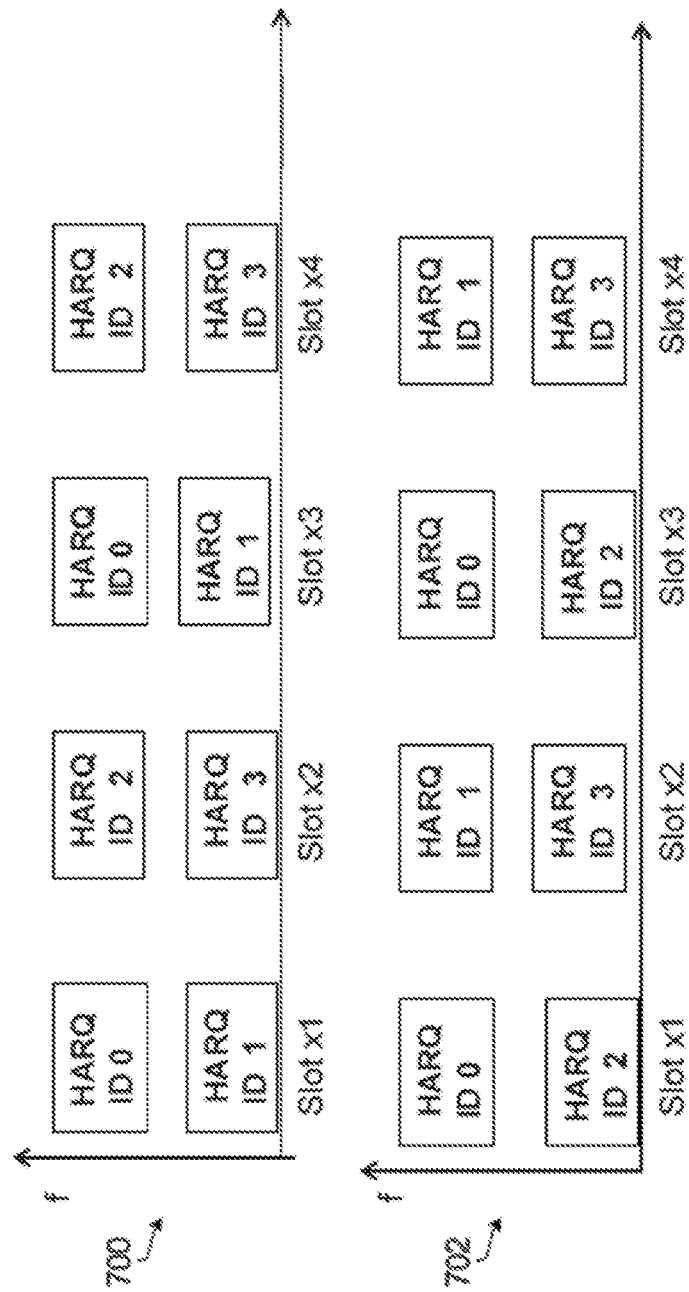
FIG. 7 is a time-frequency plot showing HARQ process resource association.

FIG. 7 shows a first example of a HARQ process resource association generally indicated at 700. Here, there are resources for two HARQ processes per time unit (slot), and the UE is configured with maximum four HARQ processes. The resources cycle through the four HARQ processes and then repeat. As such, during the first slot, resources are associated with HARQ ID 0 and HARQ ID 1, and during the second slot, resources are associated with HARQ ID 2 and HARQ ID 3. The pattern is the same during the third and fourth slots. In this case, the HARQ process increments for the available slot first, before continuing to increment in the next slot.

A second example is generally indicated at 702. The UE is also configured with maximum 4 HARQ processes and two GF resources per time unit. The BS and UE first determine that there can be one resource for each HARQ process every two time units. However, instead of cycling HARQ ID 0-3 using frequency location first, it cycles with time location first. Here, during the first slot, resources are associated with HARQ ID 0 and HARQ ID 2, and during the second slot, resources are associated with HARQ ID 1 and HARQ ID 3. The pattern is the same during the third and fourth slots. In this case, the HARQ process increments for the first resource across the first and second slots, before continuing to increment for the second resource across the first and second slots.

A third example is shown in FIG. 8 in which an association between HARQ ID and slot repetitively cycles through a set of four HARQ IDs. With this example, there is only one GF resource per slot. While the slots are shown as adjacent, there may be gaps between the slots with which GF resources are associated. And the frequency location of the GF resources at different time slots may not be aligned as shown in FIG. 8. More generally, this can be a cyclic association through resources indexes (with the possibility of more than one resource per slot, as in the example of FIG. 7).

FIG. 9 shows an example for the association of GF resource and HARQ ID. In FIG. 9, where there is a maximum number of HARQ processes of L=4, and a maximum repetition factor of K=4, but the same approach can be generalized to other numbers of HARQ processes and repetition factors. More generally, for some K, and some L, there are K continuous slots or resources mapped for each HARQ process and it is cycled through L HARQ processes. The association of the resources and HARQ process repeat itself after K×L resources. FIG. 9 shows the GF resources configured for slot index sequentially in the time domain, but the same approach can be performed more generally for resources having associated resource indices.

In some embodiments, the HARQ process ID is strictly associated with the GF resources, including both GF initial transmission and GF repetition/retransmissions. In the latter case, the repetition/retransmission of the same packet/TB should be done in the GF resources corresponding to the same process ID.

In some embodiments, retransmission will be done using GB transmission, i.e., by relying on a grant after initial transmission.

In some embodiment, only the GF initial transmission is having a predefined mapping with the HARQ process ID. And the retransmission HARQ process is identified by other criteria, e.g., through a GB retransmission, through fixed retransmission timing, through a predefined resource hopping pattern, through a MA signature mapping, through continuous repetition, etc.

In another embodiment, repetition and/or retransmission can also be done in the GF resources using the resource corresponding to the same HARQ ID. For example, referring again to FIG. 8, if a new transmission was made for HARQ ID 0 in slot 0, the next repetition or retransmission is in slot 4 which is also associated with HARQ ID 0.

Another embodiment provides a method of HARQ ID resource association with repetition factor K. In this case, the UE will make a new transmission followed by another K−1 retransmission/repetitions of the same packet/TB. In some embodiments, the UE will always send the K transmissions/repetitions. In other embodiments, the UE stops after receiving an ACK or a grant.

In some embodiments, a UE is only allowed to transmit the initial GF resource at the beginning of the K bundled slots which associated with the same HARQ ID. In this case, an initial transmission for HARQ ID 0 must be in slot 0, an initial transmission for HARQ ID 1 must be in slot 4, and so on. In this case, there is a fixed association between the resources and the HARQ process for both initial and retransmissions.

In some embodiments, there is a fixed association between the resources and the HARQ process ID for initial transmissions only. A UE can transmit initial transmission immediately after a packet arrives using the next available resource. In this case, the UE uses the HARQ ID associated with the next available resource, in accordance with the fixed resource association, for example as shown in FIG. 9. Following that, the up to K repetitions are performed for subsequent resource indices using the same HARQ ID. The repetitions do not need to be consistent with the resource and HARQ ID association for initial transmissions.

Referring again to FIG. 9, a first packet arrives at 900 during a slot having slot index 4. The initial transmission is made in slot 5 with HARQ ID=1, which is the HARQ ID associated to slot 5 through the fixed association for initial transmissions. Repetitions are transmitted in slots 6, 7 and 8 with HARQ ID=1, noting that the transmission on slot 8 is not consistent with the association for initial transmissions. A total of four transmissions are made.

A second packet arrives at 901 during a slot having slot index 10. The initial transmission is made in slot 11 with HARQ ID=2, which is the HARQ ID associated to slot 11 through the fixed association for initial transmissions. Repetitions are transmitted in slots 12,13,14 with HARQ ID=2, noting that the transmission on slots 12,13, and 14 are not consistent with the association for initial transmissions.

For these examples, even though the repetition is transmitted on a resource that is not associated with the HARQ ID as the initial transmission, the BS can identify its HARQ process ID. In the case of fixed K repetitions where K is preconfigured/signalled to the UE. Once the BS identifies the initial transmission, it knows the UE will perform continuous repetition of K times at preconfigured or signalled resources. Therefore, the BS knows the K−1 repetitions correspond to the same HARQ process ID as the first transmission. In the case that the UE is perform continuous repetition of maximum K repetitions, but repetition can be early stopped by ACK or a grant, BS knows it sends an ACK or a grant for the HARQ process so it knows when the UE will stop repetitions. Therefore any packets transmitted after the repetition would corresponding to a new packet. In some embodiment, if the repetition of the previous packet is early stopped by an ACK or grant, the UE may transmit a new packet at the next transmission resource immediately if there is a new packet in the buffer. In some embodiment, if the repetition of the previous packet is early stopped by an ACK or grant, the UE may decide to transmit the new transmission of the next packet at the next transmission resource that is corresponding to a different HARQ process ID than the previous packets.

Embodiments provide UE transmission protocols for UEs with multiple packets in the queue. The UE transmits multiple packets using different HARQ processes at different configured resources. In some embodiments, the resource corresponding to each HARQ process has been configured (for example using one of the approaches described above).

In some embodiments, if there are N resources configured for N HARQ processes per time unit, where N>2, the UE transmits N packets from its queue using the N resources. This may, for example involve transmitting the N packets in parallel using parallel resources separated in frequency or code space. The UE performs retransmission/repetition for each of these N packets until a stopping criteria is satisfied (e.g. an ACK is received for the packet/HARQ process, or a maximum number of retransmissions made/repetition, or a grant received). If there were >N packets in the queue, then remaining packets are not transmitted until after the stopping criteria for some packets is satisfied for a given HARQ process such that this HARQ process can be used to transmit a new packet.

In some embodiment, each set of resources corresponds to one HARQ process as being configured earlier In some embodiments, a relationship between HARQ process ID and resources is predefined based rules known by both the BS and UE.

Explicit or Implicit Indication of HARQ Process During GF Transmission

In some embodiments, rather than using a predefined relationship established between HARQ process ID and grant free resources for GF initial transmission, an explicit or implicit indication of HARQ process ID by the UE is used during GF transmission.

As an example of an implicit indication, in some embodiments, a MA signature mapping is used to identify HARQ process, but the HARQ process ID per se is not included in the transmission. As an example of an explicit indication, in some embodiments, the UE transmits the HARQ process ID explicitly during GF transmission. The HARQ process ID can be transmitted in a control channel or a data channel. The HARQ process ID can be protected separately from the data such that it can be decoded even if data is not successfully decoded. With these approaches, since the HARQ process is explicitly or implicitly indicated, the UE can switch to a new packet with a new HARQ process before finishing retransmission of a previous packet.

In some embodiments, the UE send an MA signature tuple to indicate a HARQ process. Each MA signature tuple corresponds to a HARQ process. For example, the UE can transmit two transmissions of the same TB using two different MA signatures, and different permutations of the two MA signatures are mapped to particular HARQ processes. The two MA signatures may form a MA signature tuple such that this tuple is mapped to a particular HARQ process. In response, the ACK/NACK may include a HARQ process ID derived from the MA signature, or may include an MA signature index to indicate which HARQ process it refers to. The MA signature used to identify the HARQ process can typically be a reference signal. In some embodiment, the MA signature may be a codebook, signature, spreading sequence of an orthogonal or non-orthogonal multiple access scheme. The MA signature may be fixed for the UE or change over time but still maintain a mapping relationship with the HARQ process.

In some embodiment, the UE may transmit multiple packets corresponding to multiple HARQ process, with each packet carried by a MA signature. For example, in an orthogonal or non-orthogonal multiple access scheme, the UE may transmit multiple packets (TBs) using different codebooks or different spreading sequence or different MA signature in general. The multiple TBs may still share the same time-frequency resource. By decoding the MA signature, the BS may identify the HARQ process/TB, and in HARQ response, the BS may explicitly or implicitly indicate the HARQ process ID or the MA signature index such that the UE can identify which TB is the HARQ feedback for.

Configuration of GF Resources (Separate Initial and Retransmission Resources)

In some embodiments, GF resources for initial transmissions are configured. The configuration of initial resources may be similar to configuration of LTE semi-persistent scheduling (SPS) resources. Various examples have been explained above. In such embodiments, the retransmission resources may be dependent on GB retransmission.

In some embodiments, the configuration of an initial transmission may include a maximum repetition number and potentially a resource hopping pattern for retransmission, which configures the retransmission resources.

In some embodiments, the initial and retransmission resources for grant-free transmission resources are configured together. The UE may perform initial or retransmissions on these resources.

In some embodiments, such as URLLC, the UE is allowed/configured to be able to use the retransmission resource of previous packet for transmission of a new packet if the new packet arrives before the next available GF resource.

Configuration of GF Resources and Packet/TB/HARQ Identification

If the initial and retransmission GF resources are configured together or if UE can use retransmission resource of previous packet to transmit a new packet, the BS needs to be able to identify which is the initial and the retransmission or identify the associated packets.

In one embodiment, the UE is configured with a maximum repetition K. After finishing the K repetitions, UE waits for an ACK/NACK or a grant for further instruction on this packet. However, if there is a new packet already arrived in the buffer, UE may choose to transmit the new packet in the next repetition resource of previous packet or the next GF resources for new packet before obtaining feedback from BS. In this case, BS can determine that the transmission is a new packet as any further retransmission of previous packets should follow BS's HARQ feedback/grant.

An example of this will be described with further reference to FIG. 9. With this approach, supposing an ACK or grant in respect of packet 900 is received in slot 6, then a new transmission can begin in slot 8. The network will know it is a new transmission because it transmitted the ACK or grant.

In another embodiment, UE's packet arrives in between the two GF initial resources, to save the latency, UE transmits the packet immediately using repetition/retransmission resources for the previous GF transmission. The BS can determine that it is new transmission as there is no packet prior to that transmission. An example of this will be described with further reference to FIG. 9. With this approach, packet 900 arrives during slot having slot index 4. The UE begins transmitting it in slot having slot index 5, and the network will know it is a new transmission as there is no prior transmission.

Identification of TB/HARQ/Packet at BS

In some embodiments, the identification of which GF transmission/retransmissions/repetition belong to a HARQ process is identified using MA signature. A specific example of a MA signature is a reference signal.

The total MA signature pool available for a UE may be divided into different MA signature tuples, each MA signature tuple represent one HARQ process.

The UE selects a different MA signature tuple for a new HARQ process or a new packet, and BS identifies the HARQ process/packets by identifying the MA signature using activity detection. MA signature tuple can be one signature or a set of signatures.

Figure 10:
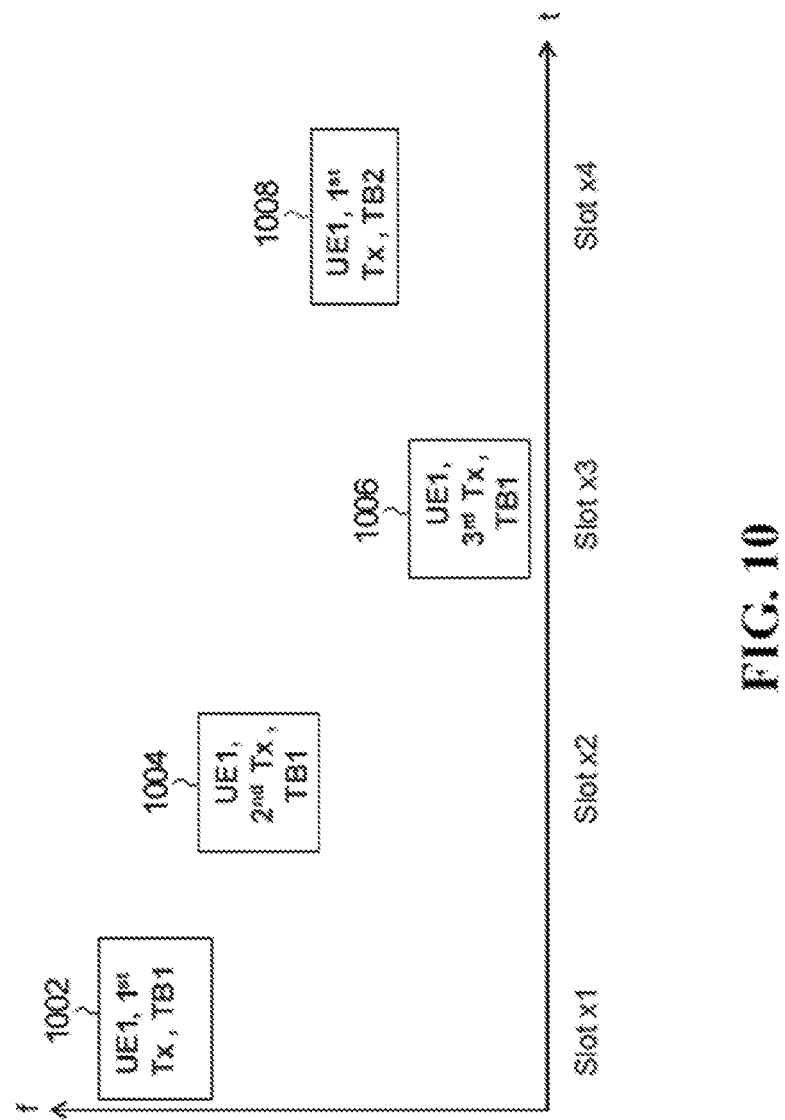
FIG. 10 is a time-frequency plot showing UE transmission resource association.

Examples will be described with reference to FIG. 10. Shown is a first transmission by a UE of a first TB at 1002 in a first slot, and retransmission/repetitions of the first TB at 1004, 1006 in second and third slots. Also shown is a first transmission of a second TB at 1008 in a fourth slot.

In a first case, the UE uses MA signatures as follows for the four slots: p1, p1, p1, p2, where p1 and p2 are different MA signatures that identify two different TBs. In this case, the MA signature tuple contains one signature.

In a second case, the UE uses MA signatures as follows for the four slots: p11, p12, p13, p21. Here, the MA signature tuple {p11, P12, p13} identifies the first TB. Note that P11, p12, p13 may further be used to identify the redundancy version (RV).

In a third case, the UE uses MA signatures as follows for the four slots: p1, p2, p2, p1. In this case, p1 identifies initial transmissions and P2 identifies retransmissions/repetitions. When the BS identifies p1, the BS knows the TB is a new TB. This approach may be employed for implementations that use synchronous retransmission.

HARQ Feedback Detail with Multiple HARQ Identification

Embodiments have been described that allow an association between HARQ processes and GF resources. Further embodiments are provided that associate resources for feedback with specific HARQ processes.

Suitable for use with embodiments featuring configuration of multiple GF resources for parallel HRQ within one TTI, the following approaches are provided:

1. Using a channel similar to a Physical Hybrid-ARQ Indicator Channel (PHICH) channel in LTE for synchronous HARQ, with multiple TBs identified from GF resource index and/or MA signature index.
2. In group ACK/NACK, multiple HARQ ACK/NACKs may be configured to include a UE index in group ID.
3. If HARQ process ID is configured to have a mapping to resource set, group ACK/NACK can also include HARQ process number Suitable for use with embodiments featuring predefined relationship between HARQ process and TF resources for GF initial transmission, and embodiments featuring implicit or explicit indication of HARQ process during GF transmission, the following approaches are provided:

4. HARQ process number included in group ACK/NACK or individual ACK/NACK;
5. Asynchronous retransmission because of HARQ process number can be identified.

In general, HARQ feedback may explicitly or implicitly include the HARQ process ID or any term that identifies the HARQ process ID or the packets.

The five approaches introduced above will now be described.

HARQ Feedback Using PHICH-Like Channel

In this embodiment, using a PHICH-like channel, the ACK/NACK is carried on an orthogonal sequence at a time-frequency location according to the index of PHICH-group. PHICH-like ACK/NACK has fixed timing. The combination of PHICH-group index and orthogonal sequence index are decided based on the combination of grant-free resource index and MA signature index (e.g. RS index).

In some embodiments, the grant-free resource index along with the MA signature index (e.g. RS index) uniquely identifies the UE along with the HARQ process. The UE detects ACK/NACK through the PHICH-like channel and knows which UE and for which HARQ process it is for based on the GF resource index and MA signature index which are determined from the received signal based on the orthogonal sequence and time frequency location. In some embodiments, the RS index may include a cyclic shift number of orthogonal cover codes (OCC) number.

In some embodiment, multiple HARQ process are carried over different MA signatures through a mapping of MA signature to the HARQ process. The MA signature index identified in PHICH-like channel can be used to identify the HARQ process HARQ Feedback Using Group ACK/NACK For this embodiment, a group DCI for group ACK/NACK is configured as a search space defined by GF-group-RNTI and CRC scrambled using GF-group-RNTI. UE has to know the GF-group-RNTI to decode the CRC. The GF-group-RNTI may be configured using higher layer signaling such as RRC, which has been described earlier. The GF-group-RNTI may also have a predefined relationship with the time slot index or time-frequency resource index known by both UE and BS, in which case, it does not need to be specifically signaled.

In some embodiments, the content for each index can be one bit for ACK/NACK only. Alternatively the content for each index is two bits, including one for activity detection (active or not), and the other for data detection (ACK/NACK)). Note that all the formats described for group DCI with two bit ACK/NACK feedback per entry can also apply the one with one bit ACK/NACK per entry.

The Group DCI may be synchronized or asynchronous. When the transmission is at slot n, in synchronous HARQ, the DCI may be transmitted at slot n+k where k is fixed. In asynchronous HARQ, there may not be a fixed timing for the DCI response. In some embodiments, for asynchronous DCI, HARQ process ID/number is explicitly indicated.

In some embodiments, a UE is assigned one or more UE position index (or ACK/NACK index) in a group-GF-RNTI ACK/NACK, with each UE position index corresponding to a specific HARQ process as described earlier. The UE can find its ACK/NACK using its position indices. An example of this format is shown in FIG. 11 for two bit ACK/NACK. Here, the UE position index is not UE specific, but is, for example, HARQ process specific.

In some embodiments, each UE is configured with a respective UE index or the group-GF-RNTI ACK/NACK. In order to support HARQ processes, the group DCI format may look, for example as depicted in FIG. 12, which includes a UE index for each UE, and a HARQ process ID for each HARQ process for the UE. Alternatively, the HARQ process can be omitted, and the ACK/NACK info is in respect of sequentially numbered HARQ processes of the UE. For example, each HARQ process can be identified through GF resource index, therefore, the HARQ process index may be replaced with GF resource index in FIG. 12.

In some embodiments, a group-GF-RNTI and UE position index are not preconfigured. The group DCI format for this case may, for example, be as depicted in FIG. 13. In this case, the HARQ process is identified through a combination of a GF resource index and MA signature index or one of them, both of which are included in the group ACK/NACK.

In some embodiments, UE can be identified through activity detection, with MA signature being used to indicate different TBs. The different TBs may or may not associate with a HARQ process identification. In some such embodiments, the group ACK/NACK has an index corresponding to an UE index together with a MA signature index to identify the TB. An example of this is depicted in FIG. 14 where the group ACK/NACK includes UE index and MA signature index fields.

In some embodiments, the HARQ process ID is explicitly signaled in the group ACK/NACK. An example is depicted in FIG. 15, where the group ACK/NACK includes a UE index or UE position index or a one or a combination of all or some of the index described in previous figures and examples, and HARQ process number/ID.

In some embodiments, suitable for example where there are a large number of potential UEs, the group DCI or group ACK/NACK may include a UE ID that can uniquely identify the UE. The group ACK/NACK may optionally also include a HARQ process identify/number. An example is shown in FIG. 16 where the group ACK/NACK includes the following fields:
   Number M of ACK/NACKs included in the group ACK/NACK;
   Then, M instances of the following fields:
      ACK/NACK (indicating whether this is for ACK or NACK)
      UE identifier that uniquely identifies the UE
      HARQ process ID for that UE.

Another approach is similar to that of FIG. 16, but suitable where activity detection does not reveal the identity of the UE. In this case, the group ACK/NACK may include a MA signature index associated with the UE instead of the UE identifier. An example is shown in FIG. 17.

In the above group ACK/NACK described from FIG. 12-17, for each entry in the format, it may also optionally contain an explicit grant for the UE or HARP process. The grant may contain the typical information (e.g. resource block, MCS, NDI,) for a DCI grant.

In some embodiments, any of the above approaches can be used to provide an individual DCI containing the fields of one of the approaches with only one entry. In some embodiments the individual DCI, or group DCI is CRC scrambled with GF_RNTI/C-RNTI or group_RNTI.

In some embodiment, the individual DCI may also contain the UE ID similar in FIG. 16 but only for a single UE.

The HARQ feedback described all above may also be transmitted in other channels other than DCI. They can be transmitted through data channels or special control channels, but with content/format similar to what has been described for group or individual DCI.

An individual DCI used may be used for early termination of a continuous retransmission. This may include the HARQ process number, as per some of the examples above. An example is depicted in FIG. 18. The format is similar to LTE SPS DCI release format except the HARQ process ID may be explicitly indicated and the reference signal index (e.g. the cyclic shift (CS) of the RS) may be also explicitly indicated.

In some embodiments an individual DCI is used to convey a switch from GF to GB, and may a grant including a HARQ process number to identify which TB to transmit. If there is only one HARQ per TTI, then HARQ process number is not needed for synchronous retransmission.

If there are multiple subbands configured in the system, a subband index may be implicitly or explicitly included in the HARQ feedback. For example, the GF resource index used for HARQ ACK/NACK response in DCI or group DCI may further include a subband index and the GF resource index within a subband.

GF Resource Configuration

In some embodiments, GF resources may be configured for multiple types of GF traffic with different latency requirements. For example, a UE may be configured with a GF resource with certain access interval (or periodicity) for initial transmission. There may be resources configured for repetition/retransmission of the GF initial transmissions. UEs with non-delay sensitive traffic are allowed to transmit initial transmission on the GF resource assigned for initial transmission only. UEs with delay sensitive traffic, e.g., URLLC, are allowed to transmit an initial transmission in a retransmission/repetition resource as well.

In another embodiment, pre-assigned resources for a first traffic type (e.g. URLLC) for a UE may be used for initial GF transmission of another traffic type for the UE (e.g. eMBB) for initial transmission. For retransmissions, the retransmission of the other traffic type is based on GB only (explicit grant), while the pre-assigned resources for first traffic type allows automatic repetition up to some maximum number of times before receiving a grant.

Resource Configuration & Indication on Sub-Bands and Numerology

In some embodiments, the network configures one or more sub-bands with mixed numerologies or single numerology, slots and mini-slots, etc. in the system as well as for an individual UE, and updates these configurations semi-statically and/or dynamically.

In another embodiment, the configurations and reconfigurations (or updates) on sub-bands, numerologies, slots and/or mini-slots can be semi-static, for example, using high-layer signaling such as broadcasting channels, multi-casting, and/or RRC messages.

In other embodiments, the configurations and reconfigurations (or updates) on sub-bands, numerologies, slots and/or mini-slots can be dynamic, for example, using L1 or DCI signaling such as a group common NR-PDCCH or uni-cast channel. In some embodiment, group common NR-PDCCH for the configuration of numerology information may be carried using PCFICH-like channel similar to the PCFICH in LTE. In some embodiment, group common NR-PDCCH for the configuration of numerology information may be carried using other special control channel. In some embodiment, the group common NR-PDCCH for the configuration of numerology information may be carried using common DCI format. In the common DCI format, a group RNTI may be signaled in high-layer signaling (e.g. in RRC) or predefined (usually as a function of the time and/or frequency location index). The group RNTI can be used to define the search space for the DCI and scrambling the CRC of the DCI.

Multiple Transport Block (TB) and Multiple (Coded Block) CB Transmission

The multiple TB and CB transmission described below may apply to wireless communication in general, including both grant-free and grant-based transmission/retransmission/repetition and may apply for both uplink or downlink transmissions.

In some embodiments, one UE may transmit multiple TBs in one grant-free or scheduled resource unit. See for example FIG. 23. For example, each TB may represent a spatial layer/a codebook of a MIMO transmission. The following figure shows an example of transmitting 2 TBs, which may be transmitted over two different antenna ports. The multiple TBs may correspond to the same HARQ process ID or they may correspond to multiple HARQ process IDs. If the multiple TBs correspond to the same HARQ process ID, then the HARQ response (ACK/NACK or grant) of one TB or more TBs may explicitly or implicitly indicate the TB index or indexes on top of HARQ process ID. If the multiple TBs corresponding to different HARQ processes, then the BS can explicitly or implicitly indicate the individual HARQ process IDs in HARQ feedback (ACK/NACK or a grant).

In some embodiments, one transport block (TB) of a UE's transmission may contain multiple coded blocks (CBs). See for example FIG. 24. Each CB can be independently decoded and any one or more CBs can be indicated by acknowledge (ACK/NACK) messages in a group based signaling (e.g. group common PDCCH channel) or in an individual signaling. In some embodiments, different CBs within one TB can carry the same data packet of the same UE. In some embodiments, different CBs within one TB can correspond to different data packets or different traffic types of the same UE. In some embodiments, different CBs within one TB can correspond to different data packets or data with different traffic types of different UEs. Each CB may correspond to a new data transmission or a repetition/retransmission of a previous data transmission. And there can be a mixture of new transmission and retransmissions in different CBs of the same TB. The following figure shows an example of a TB transmission which contains 4 CBs. In one specific example, CB1 and CB2 may belong to a retransmission of one data packet of UE 1, CB3 can corresponding to a new transmission of a different data packet of UE 1, while CB4 correspond to a data packet of a different UE, UE 2. Different CBs within a TB of the same UE may correspond to a different HARQ process ID or share the same HARQ process ID.

To transmit a HARQ feedback (an ACK/NACK or a grant) of a specific CB or TB, in some embodiments the BS explicitly or implicitly includes a CB index and/or TB index on top of HARQ process ID such that the UE can identify which CB or TB it is ACK/NACK or grant for. For example, in group ACK/NACK, the ACK/NACK index may now include a combination of at least one or some of the HARQ process index, TB index and CB index.

In some embodiment, a UE can transmit a new packet in the resource assigned to the retransmission/repetitions of the previous packet from the same UE or different UEs. An example is shown in FIG. 25. The transmission of the new packet may be transmitted using a different CB or TB than the CB or TB used for retransmission/repetition of a previous data packet in the same transmission resource. In some embodiments, the BS or network may explicitly or implicitly signals or indicates to the UE to transmit a new packet in the previous retransmission/repetition resource(s). FIG. 3 shows an example of two transmissions from a UE, each containing one TB and two CBs inside the TB. The two transmissions can be a grant-free transmission/retransmission/repetition or a grant-based transmission/retransmission/repetition. In one embodiment, CB1 and CB2 may contain different data packets that are encoded separately into two different coded blocks. For example, CB1 in the $1^{st}$ transmission of the UE corresponds to an initial transmission of data packet/block 1, and CB2 in the $1^{st}$ transmission corresponds to an initial transmission of data packet/block 2, the two CBs may share the same HARQ process ID=0; In the $2^{nd}$ transmission, only one CB is needed for the retransmission. There may be different reasons for that. For example, one of the data packet/block (e.g. data packet 2) may be successfully transmitted. The base station may send a CB level ACK/NACK or grant. For example, the BS may send a ACK/NACK feedback indicating CB1 is not successfully decoded (NACK on CB1) and CB2 is successfully decoded (ACK on CB2). In some embodiments, only an ACK for CB2 or NACK for CB2 is transmitted. In another example, the BS or network may send a DCI grant corresponding to $1^{st}$ transmission, where there is separate grant information for CB1 and CB2. For example, in CB1, the new data indicator (NDI) field of the grant may be 1 or not toggled; indicating a retransmission of the data packet corresponds to CB1. While the NDI field is 0 or toggled in the grant for CB2, indicating a new transmission at CB2. Then in the $2^{nd}$ transmission, following the ACK/NACK or grant, the UE retransmits the data packet 1 on CB1 and transmits a new data packet 3 in CB2. Note that both BS and UE knows the relationship between data packets and CBs as it is indicated through the signaling by BS.

In some embodiments, the UE may be able to decide to transmit a new packet in a transmission resource assigned for retransmission/repetition of a previous packet without a grant or with a grant but the grant does not indicate the UE to do so. The transmission of the new packet may be transmitted using a different CB or TB than the CB or TB used to retransmit/repetition of a previous data packet within the same transmission resource. In this case, for the BS or network to identify that the new packet, the UE may explicitly or implicitly indicate that a new packet is transmitted on the specific CB. An example of explicitly signaling is to transmit an indication signaling that indicates the CB is a new packet transmission. The indication can be done in a control channel or data channel. It may be separately encoded from the data such that it can be better protected and decoded without decoding the data. The indication can be a packet ID, HARQ ID corresponding to the CB or a flag that tells the CB is for a new packet transmission. An example of implicit signaling is to carry this information over MA signature. For example, one set of MA signatures may correspond to a new packet or a packet ID or a HARQ ID on the CB.

In another embodiment, a UE may perform continuous repetition of the multiple CBs corresponding to multiple different data packets. For example, in FIG. 3, one of the data packets corresponding to CB2 may be successfully decoded and ACKed. Therefore, in the $2^{nd}$ transmission, only $1^{st}$ data packet corresponding to $1^{st}$ transmission of CB1 is repeated at $2^{nd}$ transmission of CB1. In this scenario, the UE may choose to transmit a new packet in CB2.

In some embodiments, the different CBs may correspond to the same data packet although the different CBs are separately encoded and can be decoded successfully. For example, the data packet may be encoded by an outer code. Different encoded bits of the outer code may be further encoded separately on different CBs. An example of the outer code is a fountain code or a rateless code. The BS can combine different CBs that corresponding to the same data packet by further decoding the outer code. If FIG. 25 is used as an example, the BS may decode the different CBs separately first. To send an ACK/NACK of CB level for this transmission, the BS may only need to indicate how many CBs has been successfully decoded. In the example of FIG. 25. There is only 1 CB successfully decoded. When the UE receives this information, UE knows that only 1 CB of the same data packet need to be retransmitted. The UE then transmit at CB1 of $2^{nd}$ transmission a retransmission of the same packet in CB1 of $1^{st}$ transmission. The UE may choose to transmit a new packet in CB2.

In other embodiments, all the transmissions and acknowledge process for CBs apply to both downlink and uplink. For the downlink case, a single transmitter (for example eNB or gNB) transmits data to single UE or multiple UEs.

Note that in the description of the protocols and examples above, we have used uplink as an example, where UE is the one sending the packet and receive HARQ feedback (ACK/NACK), and BS is the one sending the ACK/NACK and receiving the packet. The same protocols can be applied to downlink, in which case, the BS is the one sending the transmission and receiving ACK/NACK and UE is to receiving the transmission and sending ACK/NACK.

In some embodiments, a CB contains mixed data from new packet and retransmitted packet from same transmitter or from different transmitter. In other embodiments, a CB contains mixed data from different retransmitted packet from same transmitter or from different transmitter.

More generally, all the transmission protocols and indication methods described for multiple CB transmission within a TB can also be applied to multiple TB transmissions within a single scheduled or GF transmission.

All the description in this disclosure regarding a code block (CB) or code block index may also be applied to more than one transport block, e.g. a code block group (CBG), which contains more than one CB.

Referring back to FIG. 9, it should be made clear that two different embodiments are depicted in one Figure, as described in detail above. In the first embodiment, a given transmission or retransmission can only be made in a slot associated with the HARQ process ID of the slot. For example, for HARQ process ID 0, an initial transmission and three retransmissions/repetitions can only take place in slots 0,1,2 and 3. In the second embodiment, the HARQ mapping only defines resources for the initial transmission. For example, for HARQ process ID 1, any one of slots 4,5,6, and 7 can be used for the initial transmission. Subsequent slots used for retransmissions/repetitions are not necessarily mapped to HARQ process ID 1.

Figure 19:
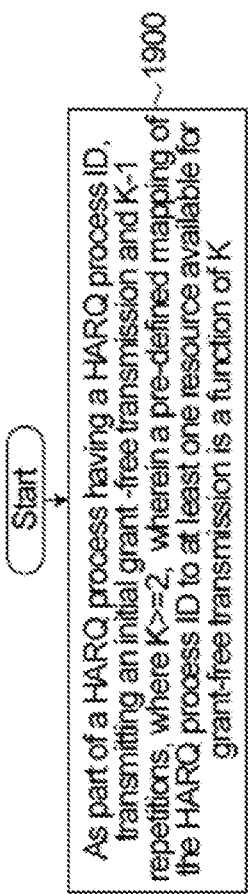
FIG. 19 is a flowchart showing a method in a UE, according to one embodiment.

Referring now to FIG. 19, shown is a flowchart of a method in a UE. The method involves, in block 1900, as part of a HARQ process having a HARQ process ID, transmitting an initial grant-free transmission and K−1 repetitions, where K>=2. A pre-defined mapping of the HARQ process ID to at least one resource available for transmitting the initial grant-free transmission is a function of K.

It is noted that both embodiments of resource mapping of FIG. 9 are examples of the method of FIG. 19 where K is 4.

Optionally, the mapping is also a function of a maximum number of HARQ processes. In FIG. 9, where there is a maximum number of HARQ processes of L=4, and a maximum repetition factor of K=4, but the same approach can be generalized to other numbers of HARQ processes and repetition factors. More generally, for some K, and some L, there are K consecutive slots or resources that may be mapped for each HARQ process, and the configuration of K consecutive slots or resources may be cycled through L HARQ processes. The association of the resources and HARQ process repeat itself after K×L resources.

It is noted that references herein to "continuous grant-free resources" or a "set of continuous grant-free resources" mean continuous in terms of the available resources for grant-free transmission. However, it should be understood that between two "continuous grant-free resources", there can be intervening resources for other purposes, such as scheduled traffic. An example of this is shown in FIG. 10, where if there are no intervening GF resources between GF resources 1002,1004, and no intervening GF resources between GF resources 1004,1006, then resources 1002, 1004,1006 can be termed continuous grant-free resources. Equivalently, such resources can be referred to as "consecutive grant-free resources". For example, the number of TT is (or periodicity) between two adjacent GF resources in the time domain may be configured in RRC for grant-free transmission as described earlier in this disclosure, in this case, two consecutive grant-free resources may be separated by a time length defined by periodicity in time domain.

As detailed above, in some embodiments, the HARQ process ID is based on a resource for the initial grant-free transmission in accordance with the mapping.

In some embodiments, the mapping maps the HARQ process ID to a plurality K of resources including a first resource, and the UE transmits the initial grant-free transmission using the first resource. This is consistent with FIG. 9, first embodiment.

Alternatively, the mapping maps the HARQ process ID to a plurality of resources, and the UE transmits the initial grant-free transmission using any one of the plurality of resources. This is consistent with the second embodiment of FIG. 9. An advantage of this approach is that the initial transmission can take place sooner than would be the case if only the first mapped resource could be used for initial transmission.

In some embodiments, the initial transmission is transmitted using a first multiple access signature pre-defined for initial UE transmissions, and the repetitions are transmitted using a second multiple access signature. This is consistent with the example above referred to as the third case in the context of FIG. 10.

In some embodiments, the mapping maps the HARQ process ID to a consecutive plurality of consecutive resources within an overall set of grant-free resources. The embodiments of FIG. 9 are consistent with this approach.

Optionally, for any of the embodiments described herein, each of the at least one resource is one of a plurality of grant free resources, wherein the plurality of grant free resources is periodically spaced in time.

Figure 20:
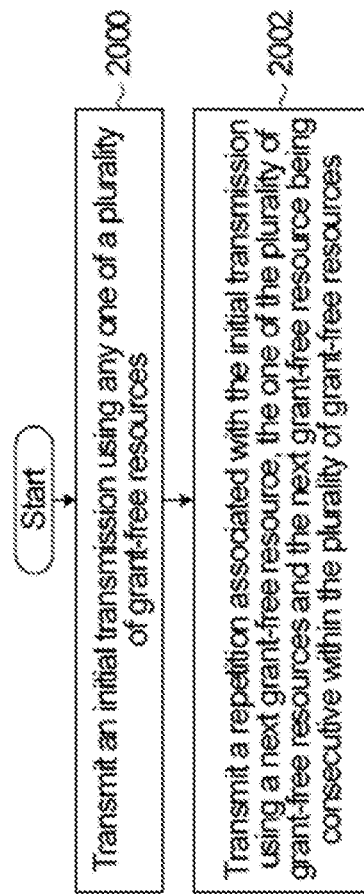
FIG. 20 is a flowchart showing a method in a UE, according to another embodiment.

Referring now to FIG. 20, shown is a flowchart of a method in a UE. The method involves transmitting an initial transmission using any one of a plurality of grant-free resources in block 2000. The method continues with transmitting a repetition associated with the initial transmission using a next grant-free resource, the one of the plurality of grant-free resources and the next grant-free resource being consecutive within the plurality of grant-free resources in block 2002.

FIG. 9 second embodiment, shows an example of this, where there is no restriction on when an initial transmission takes place, and subsequent repetitions occur immediately following the initial transmission. By immediately following, this means the next grant free resource. It should be understood that resource may intervene between consecutive grant free resources, for example resources available for grant-based transmission.

Figures 21, 22:
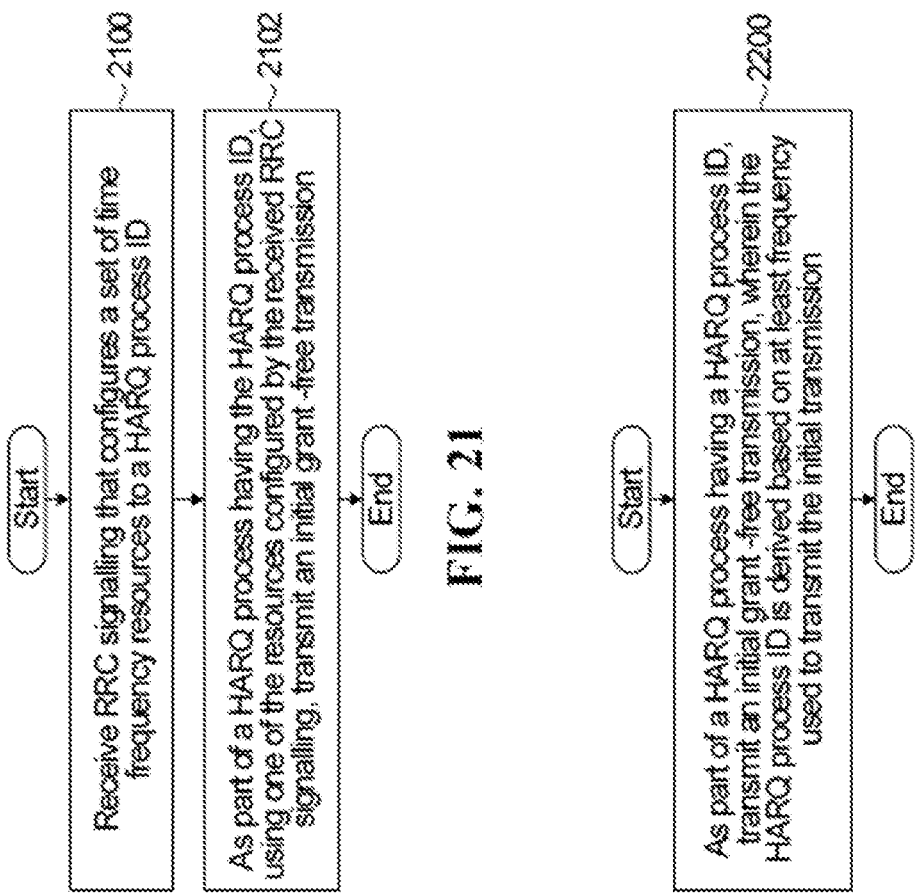
FIG. 21 is a flowchart showing a method in a UE, according to yet another embodiment.
FIG. 22 is a flowchart showing a method in a UE, according to yet another embodiment.

Referring now to FIG. 21, shown is a flowchart of a method in a UE. The method involves receiving RRC signalling that configures a set of time frequency resources to a HARQ process ID in block 2100. Next, in block 2102, as part of a HARQ process having the HARQ process ID, using one of the resources configured by the received RRC signalling, the UE transmits an initial grant-free transmission.

In some embodiments, the set of time frequency resources includes K time frequency resources, and the method further comprises as part of the HARQ process having the HARQ process ID, using resources configured by the received RRC signalling, transmitting K–1 repetitions, where K>=2.

Referring now to FIG. 22, shown is a flowchart of a method in a UE. The method involves, in block 2200, as part of a HARQ process having a HARQ process ID, transmitting an initial grant-free transmission. The HARQ process ID is derived based on at least frequency used to transmit the initial transmission. See for example, the discussion above concerning the use of two parallel sets of resources that are configured such that within one time unit/slot, there are two GF resources in different frequency locations, the one with higher frequency band index may be corresponding to HARQ process 0, the other is then corresponding to HARQ process 1 or vice versa.

FURTHER EXAMPLES

Example 1

A method in a network element to configure grant-free resources for a user equipment, the method comprising:
  i. the network element transmitting signalling to configure multiple sets of resources corresponding to multiple hybrid automatic repeat request (HARQ) processes for the user equipment.

Example 2

The method of example 1 wherein the multiple sets of resources comprise multiple resources per time unit.

Example 3

The method of example 1 wherein the signalling comprises a message including at least one of:
  an indication of a maximum number of HARQ processes;
  a user identifier;
  resource indications for each of HARQ process.

Example 4

The method of example 1 wherein the signalling comprises multiple downlink channel information (DCI) activations for the multiple HARQ processes.

Example 5

The method of example 3 wherein the signalling comprises the resource indications for each HARQ process, the resource indications including a HARQ identifier (ID).

Example 6

The method of example 1 to example 5 wherein the signalling is transmitted using one of:
  higher layer signalling;
  combination of higher layer signalling and dynamic signalling;
  combination of broadcast signalling and higher layer signalling;
  combination of broadcast signalling, higher layer signalling; and dynamic signalling.

Example 7

The method of example 1 to example 6 wherein the signalling includes a UE index associated with a specific location for ACK/NACK for the user equipment assigned that UE index.

Example 8

The method of example 1 to example 6 wherein the signalling includes a UE ACK/NACK index for each HARQ process, the ACK/NACK index associated with a specific location for ACK/NACK for the HARQ process.

Example 9

A method comprising:
  performing activity detection and HARQ process identification for grant-free (GF) transmissions, wherein GF resources are configured for multiple HARQ processes;
  wherein performing HARQ process identification is based on a predefined relationship between HARQ ID and transmission resources of an initial GF transmission of the GF transmissions.

Example 10

The method of example 9 further comprising:
  deriving a HARQ ID based on at least one of: a current time unit number, a grant free access interval, a number of grant free resources per time unit, a grant free resource index within the time unit, and a number of configured HARQ processes.

Example 11

The method of example 9 or example 10 wherein the predefined relationship associates at least one HARQ process ID with at least two time units.

Example 12

The method of example 11 wherein at least two HARQ process IDs are associated with each of at the at least two time units.

Example 13

The method of example 12 wherein HARQ process IDs cycles through GF resources in frequency and then in time.

Example 14

The method of example 12 wherein HARQ process IDs cycles through GF resources in time and then in frequency.

Example 15

The method of example 9 to example 12 further comprising:
  after failing to decode an initial transmission received on one of the resources configured for initial transmission, receiving a grant-based retransmission.

Example 16

The method of example 9 to example 12 further comprising:
  after failing to decode the initial transmission received on one of the resources configured for initial transmission, receiving at least one retransmission at the resource corresponding to the same HARQ ID.

Example 17

The method of example 9 to example 16, wherein:
  the predefined relationship associates each HARQ process ID with a plurality of resources associated with a corresponding plurality of resource indexes, each corresponding plurality of resource indexes including a first resource index.

Example 18

The method of example 17 wherein an initial transmission is only allowed for a given HARQ process ID on the resource associated with the first index of the corresponding plurality of resource indexes;
  the method further comprising receiving at least one repetition in a resource associated with a second index of the corresponding plurality of resource indexes for the HARQ process ID.

Example 19

The method of example 17 wherein:
  an initial transmission can be received for a given HARQ process on any of the associated plurality of resources;
  at least one repetition for the given HARQ process is received on a resource associated with a resource index subsequent to a resource index of the resource used for the initial transmission.

Example 20

The method of example 19 wherein:
  a predetermined number of GF retransmissions are received; or
  GF retransmissions are received until an ACK or a grant is transmitted.

Example 21

A method comprising:
  receiving a GF transmission associated with a HARQ process ID, the GF transmission including an explicit or implicit indication of a HARQ process ID.

Example 22

The method of example 21 wherein:
  receiving the GF transmission comprises performing multiple access signature detection;
  the method further comprising determining the HARQ process ID based on at least one detected multiple access signature.

Example 23

The method of example 22 further comprising:
  determining HARQ process ID and redundancy version based on at least one detected multiple access signature.

Example 24

The method of example 22 further comprising:
  determining whether the transmission is an initial transmission or a retransmission based on at least one detected multiple access signature.

Example 25

The method of any preceding example further comprising:
  performing activity detection, UE identification, HARQ process identification and data detection for resources configured for multiple HARQ processes.

Example 26

The method of any preceding example further comprising:
  transmitting ACK/NACK based on the result of activity detection, UE identification, HARQ process identification.

Example 27

The method of example 1 further comprising wherein transmitting ACK/NACK based on a result of activity detection by using a PHICH-like channel, with the ACK/NACK being carried on an orthogonal sequence at a time-frequency location according to an index of a PHICH-group.

Example 28

The method of example 27 further comprising:
determining a combination of group index and orthogonal sequence index based on a combination of grant-free resource index and multiple access signature index.

Example 29

The method of example 1 further comprising using a grant free resource index along with a multiple access signature index to identify the UE and HARQ process.

Example 30

The method of any preceding example further comprising:
transmitting a group ACK/NACK.

Example 31

The method of example 30 wherein the group ACK/NACK contains at least:
for each of a plurality of ACK/NACKs a UE position index, and the ACK/NACK.

Example 32

The method of example 30 wherein the group ACK/NACK contains at least:
for each of a plurality of UEs, a UE index;
for each of a plurality of HARQ processes for each UE, a HARQ process index and an ACK/NACK.

Example 33

The method of example 30 wherein the group ACK/NACK contains at least:
for each of a plurality of GF resources, a GF resource index;
for each GF resource a plurality of multiple access signature index and a corresponding plurality of ACK/NACKs.

Example 34

The method of example 30 wherein the group ACK/NACK contains at least:
for each of a plurality of UEs, a UE index;
for each of a plurality of transport blocks for each UE, a multiple access signature associated with the transport block.

Example 35

The method of example 30 wherein the group ACK/NACK contains at least:
for each of a plurality of UEs, a UE index;
for each UE index, at least one ACK/NACK and corresponding HARQ process ID.

Example 36

The method of example 30 wherein the group ACK/NACK comprises for each of a plurality of ACK/NACKs of the group ACK/NACK:
a UE ID and optionally a HARQ process ID.

Example 37

The method of example 30 wherein the group ACK/NACK comprises for each of a plurality of ACK/NACKs of the group ACK/NACK:
a multiple access signature index and optionally a HARQ process ID.

Example 38

A base station configured to perform the method of any one of examples 1 to 37.

Example 39

A method in a user equipment comprising:
receiving signalling transmitted in accordance with the method of any one of examples 1 to 6 to configure resources for multiple HARQ processes;
transmitting a grant-free transmission with HARQ processes using the resources configured.

Example 40

The method of example 39 further comprising receiving ACK/NACK transmitted in accordance with the method of any one of examples 27 to 29.

Example 41

A method in a user equipment comprising:
making multiple HARQ process transmissions based on a predefined relationship between HARQ process ID and resources for initial transmissions, consistent with the method of any one of examples 9 to 20.

Example 42

A method in a user equipment comprising:
making multiple HARQ process transmissions with an implicit or explicit indication of HARQ process during grant free transmission, consistent with the method of any one of examples 21 to 24.

Example 43

The method of any one of examples 39 to 38 further comprising:
receiving ACK/NACK transmitted in accordance with the method of any one of examples 26 to 37.

Example 44

A user equipment configured to implement the method of any one of examples 39 to 43.

Example 45

A method in a UE, the method comprising:
transmitting an initial transmission using any one of a plurality of grant-free resources;
transmitting a repetition associated with the initial transmission using a next grant-free resource, the one of the plurality of grant-free resources and the next grant-free resource being consecutive within the plurality of grant-free resources.

Example 46

A method in a UE, the method comprising:
receiving RRC signalling that configures a set of time frequency resources to a HARQ process ID;
as part of a HARQ process having the HARQ process ID, using one of the resources configured by the received RRC signalling, transmitting an initial grant-free transmission.

Example 47

The method of example 46 wherein the set of time frequency resources includes K time frequency resources, the method further comprising:
as part of the HARQ process having the HARQ process ID, using resources configured by the received RRC signalling, transmitting K−1 repetitions, where K>=2.

Example 48

A method in a UE, the method comprising:
as part of a HARQ process having a HARQ process ID, transmitting an initial grant-free transmission;
wherein the HARQ process ID is derived based on at least frequency used to transmit the initial transmission.

Some embodiments address some of the motivations and issues on how to perform acknowledgement/indication of successful receiving by gNB of a TB transmitted without grant.

In some embodiments, an UL transmission scheme without grant supports K (K>=1) repetitions including initial transmission of the same TB. The number of maximum repetitions, K, is a configurable parameter. To support URLLC service, the number of maximum repetitions can be determined according to the delay budget, numerology and slot duration. However, there is some tradeoff in selecting K for a UE. If K is too large, it may cause unnecessary transmissions for some users with good channel quality that requires smaller number of consecutive transmissions for successful reception. Thus, the wasted more repetitions for these users will cause unnecessary interference to other grant-free UEs sharing the same resources. On the other hand, if K is set too small, UE will possibly need to wait for an HARQ response or UL grant after K repetitions, then the reliability of URLLC UE may not be satisfied within the latency bound. A good solution for URLLC UE is to set K according to the latency requirement but allows for an early termination of the repetition transmissions of the TB through a DL acknowledgement/indication. The embodiments described below provide solutions for such acknowledgment/indication and HARQ response for UL grant-free transmission.

PHICH-Like Channel

A PHICH-like channel may be included in NR for ACK/NACK of grant-based and grant-free uplink transmission. For the purpose of indication of successful reception of a TB for grant-free transmission to stop further unnecessary retransmissions, an acknowledgment is enough. Sending a full uplink grant for this purpose may be causing unnecessary overhead, especially when the number of grant-free users is large. The PHICH-like channel, which only convey an ACK or NACK for a TB is a great fit for this purpose.

The PHICH-like channel can be designed similar to the PHICH channel in LTE. To identify the corresponding TB and UE, the ACK/NACK information can be carried on different orthogonal sequences in different groups. The combination of the index of the orthogonal sequence and PHICH-like groups can be mapped to a combination of different grant-free resource parameters. This mapping can identify the ACK/NACK for a specific TB. Therefore, a grant-free UE can identify which ACK/NACK is carried for a particular TB.

In some embodiments, a PHICH-like channel can be used as acknowledgement/indication of successfully receiving a TB in grant-free transmission with minimum overhead.

DCI Based Solution

In another embodiment, acknowledgement of a TB for grant-free transmission is by sending the acknowledgement through DCI. The DCI can be a group ACK/NACK transmitted through a group common DCI. The reason sending a group ACK/NACK may be more suitable than sending an individual ACK/NACK or grant separately is that there are multiple potential users for grant-free transmissions, and there is only one bit of information needs to be conveyed for stopping further repetitions of a TB, group ACK/NACK will be much more efficient in terms of signaling overhead.

The group ACK/NACK may be transmitted using group common DCI. Group DCI is already supported by LTE and NR. For supporting ACK/NACK of a group of UEs, we only need to define a new DCI format for this purpose.

In some embodiments, a group common DCI can also be used as acknowledgement/indication of successfully receiving TBs in grant-free transmission.

Another solution for indicating acknowledgement of a TB for a grant-free transmission is to use individual DCI or unicast DCI. However, if the purpose of this DCI is for early stopping a continuous repetition for grant-free transmission, using current grant based DCI format may incur significant signaling overhead.

In some embodiments, unicast DCI can also be used for the purpose of early stopping a continuous retransmission. However, using the current grant based unicast DCI for this purpose is inefficient in terms of signaling overhead.

There are other channels (such as data channels) that can be used for HARQ feedback indication, which will not be discussed here in detail.

In some embodiments, for UE configured with K repetitions without a grant, UE stops repetition of a UE TB if an acknowledgement/indication of successfully receiving that TB is received from gNB.

In some embodiments, at least a PHICH-like channel or a group ACK/NACK channel is supported for an acknowledgement/indication of successfully receiving TB(s) in a grant-free transmission configured with K repetitions.

In an embodiment, a method for communicating in a network is provided. The method includes receiving, by a user equipment (UE), a resource configuration from a base station for transmissions without dynamic grant which defines K resources for K transmissions of a transport block (TB) and transmitting, by the UE, an initial transmission without dynamic grant of the TB using a resource among the K resources that is not the beginning resource of the K resources. In one example, each of the K resources supports initial transmission of the TB without dynamic grant. In the same example, or another example, the method further includes transmitting, by the UE, a retransmission of the TB using a next available resource of the K resources. In any one of the preceding examples, or in another example, the resource configuration is received via radio resource control (RRC) signaling. In any one of the preceding examples, or in another example, the resource configuration is received via a combination of radio resource control (RRC) signaling and downlink control information (DCI) signaling. In any one of the preceding examples, or in another example, the K resources correspond to a same hybrid automatic repeat request (HARQ) process identifier (ID) for transmissions without dynamic grant. In such an example, the HARQ process ID may be determined based on the initial transmission. For instance, the HARQ process ID may be determined based on an index of a time unit where the resource used for the initial transmission is located, a periodicity, and a configured maximum number of HARQ processes. An apparatus (e.g., a user equipment (UE)) for performing this method is also provided.

In another embodiment, another method for communicating in a network is provided. This method includes transmitting, by a base station, a resource configuration to a user equipment (UE) for transmissions by the UE without dynamic grant from the base station. The resource configuration defines K resources for K transmissions of a transport block (TB). The method further includes receiving, by the base station, an initial transmission without dynamic grant of the TB using a resource among the K resources that is not a starting resource of the K resources. In one example, each of the K resources supports initial transmission of the TB without dynamic grant. In the same example, or another example, the method further includes receiving, by the base station, a retransmission of the TB using a next available resource of the K resources. In any one of the preceding examples, or in another example, the resource configuration is received via radio resource control (RRC) signaling. In any one of the preceding examples, or in another example, the resource configuration is received via a combination of radio resource control (RRC) signaling and downlink control information (DCI) signaling. In any one of the preceding examples, or in another example, the K resources correspond to a same hybrid automatic repeat request (HARQ) process identifier (ID) for transmissions without dynamic grant. In such an example, the HARQ process ID may be determined based on the initial transmission. For instance, the HARQ process ID may be determined based on an index of a time unit where the resource used for the initial transmission is located, a periodicity, and a configured maximum number of HARQ processes. A base station for performing this method is also provided. A system including the base station and UE is also provided.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

What is claimed is:

1. A method comprising:
   receiving, by a user equipment (UE), a resource configuration from a base station for a plurality of transmissions without dynamic grant, wherein the resource configuration defines K resources for K transmissions, wherein the K transmissions are for a transport block (TB) carrying data, and wherein the K resources correspond to a same hybrid automatic repeat request (HARQ) process identifier (ID) for the plurality of transmissions, the plurality of transmissions including an initial transmission of the TB and at least one up to K−1 retransmissions of the TB, K being an integer greater than or equal to 2;
   transmitting, by the UE, the initial transmission of the TB without dynamic grant of the TB using a non-first resource among the K resources that is at a later time than a beginning resource of the K resources; and
   transmitting, by the UE, a retransmission of the TB using a next available resource of the K resources,
   wherein the K resources are in K consecutive slots, the retransmission is a first retransmission of the TB, and the next available resource is in a next immediate available slot of the K consecutive slots to a slot of the non-first resource, and
   wherein the same HARQ process ID is determined based on an index of a time location of the non-first resource, a periodicity, and a configured maximum number of HARQ processes.

2. The method of claim 1, wherein each of the K resources supports the initial transmission of the TB without dynamic grant.

3. The method of claim 1, wherein the resource configuration is received via radio resource control (RRC) signaling.

4. The method of claim 1, wherein the resource configuration is received via a combination of radio resource control (RRC) signaling and downlink control information (DCI) signaling.

5. The method of claim 1, wherein the same HARQ process ID is determined based on the initial transmission.

6. A user equipment (UE) comprising:
   at least one processor; and
   a non-transitory computer readable storage medium storing programming for execution by the at least one processor, the programming including instructions to cause the UE to:
      receive a resource configuration from a base station for a plurality of transmissions without dynamic grant, wherein the resource configuration defines K resources for K transmissions, wherein the K transmissions are for a transport block (TB) carrying data, and wherein the K resources correspond to a same hybrid automatic repeat request (HARQ) process identifier (ID) for the plurality of transmissions, the plurality of transmissions including an initial transmission of the TB and at least one up to K−1 retransmissions of the TB, K being an integer greater than or equal to 2; and
      transmit the initial transmission of the TB without dynamic grant of the TB using a non-first resource among the K resources that is at a later time than a beginning resource of the K resources; and
      transmit a retransmission of the TB using a next available resource of the K resources,
      wherein the K resources are in K consecutive slots, the retransmission is a first retransmission of the TB, and the next available resource is in a next immediate available slot of the K consecutive slots to a slot of the non-first resource, and
      wherein the same HARQ process ID is determined based on an index of a time location of the non-first resource, a periodicity, and a configured maximum number of HARQ processes.

7. The UE of claim 6, wherein each of the K resources supports the initial transmission of the TB without dynamic grant.

8. The UE of claim 6, wherein the resource configuration is received via radio resource control (RRC) signaling.

9. The UE of claim 6, wherein the resource configuration is received via a combination of radio resource control (RRC) signaling and downlink control information (DCI) signaling.

10. The UE of claim 6, wherein the same HARQ process ID is determined based on the initial transmission.

11. A method comprising:
    transmitting, by a base station, a resource configuration to a user equipment (UE) for a plurality of transmissions without dynamic grant, wherein the resource configuration defines K resources for K transmissions, wherein the K transmissions are for a transport block (TB) carrying data, and wherein the K resources correspond to a same hybrid automatic repeat request (HARQ) process identifier (ID) for the plurality of transmissions, the plurality of transmissions including an initial transmission of the TB and at least one up to K−1 retransmissions of the TB, K being an integer greater than or equal to 2;
    receiving, by the base station from the UE, the initial transmission of the TB without dynamic grant of the TB using a non-first resource among the K resources that is at a later time than a beginning resource of the K resources; and
    receiving, by the base station, a retransmission of the TB using a next available resource of the K resources,
    wherein the K resources are in K consecutive slots, the retransmission is a first retransmission of the TB, and the next available resource is in a next immediate available slot of the K consecutive slots to a slot of the non-first resource, and
    wherein the same HARQ process ID is determined based on an index of a time location of the non-first resource, a periodicity, and a configured maximum number of HARQ processes.

12. The method of claim 11, wherein each of the K resources supports the initial transmission of the TB without dynamic grant.

13. The method of claim 11, wherein the resource configuration is transmitted via radio resource control (RRC) signaling.

14. The method of claim 11, wherein the resource configuration is transmitted via a combination of radio resource control (RRC) signaling and downlink control information (DCI) signaling.

15. The method of claim 11, wherein the same HARQ process ID is determined based on the initial transmission.

16. A base station comprising:
    at least one processor; and
    a non-transitory computer readable storage medium storing programming for execution by the at least one processor, the programming including instructions to cause the base station to:
       transmit a resource configuration to a user equipment (UE) for a plurality of transmissions without dynamic grant, wherein the resource configuration defines K resources for K transmissions, wherein the K transmissions are for a transport block (TB) carrying data, and wherein the K resources correspond to a same hybrid automatic repeat request (HARQ) process identifier (ID) for the plurality of transmissions, the plurality of transmissions including an initial transmission of the TB and at least one up to K−1 retransmissions of the TB, K being an integer greater than or equal to 2;
       receive, from the UE, the initial transmission of the TB without dynamic grant of the TB using a non-first resource among the K resources that is at a later time than a beginning resource of the K resources; and
       receive a retransmission of the TB using a next available resource of the K resources,
    wherein the K resources are in K consecutive slots, the retransmission is a first retransmission of the TB, and the next available resource is in a next immediate available slot of the K consecutive slots to a slot of the non-first resource, and
    wherein the same HARQ process ID is determined based on an index of a time location of the non-first resource, a periodicity, and a configured maximum number of HARQ processes.

17. The base station of claim 16, wherein each of the K resources supports the initial transmission of the TB without dynamic grant.

18. The base station of claim 16, wherein the resource configuration is transmitted via radio resource control (RRC) signaling.

19. The base station of claim 16, wherein the resource configuration is transmitted via a combination of radio resource control (RRC) signaling and downlink control information (DCI) signaling.

20. The base station of claim 16, wherein the same HARQ process ID is determined based on the initial transmission.

21. A system comprising a base station and a user equipment (UE), wherein:
the base station configured to:
transmit a resource configuration for a plurality of transmissions without dynamic grant to the UE, wherein the resource configuration defines K resources for K transmissions, wherein the K transmissions are for a transport block (TB) carrying data, and wherein the K resources correspond to a same hybrid automatic repeat request (HARQ) process identifier (ID) for the plurality of transmissions, the plurality of transmissions including an initial transmission of the TB and at least one up to K−1 retransmissions of the TB, K being an integer greater than or equal to 2; and
the UE configured to:
receive the resource configuration,
transmit the initial transmission of the TB without dynamic grant of the TB using a non-first resource among the K resources that is at a later time than a beginning resource of the K resources, and
transmit a retransmission of the TB using a next available resource of the K resources,
wherein the K resources are in K consecutive slots, the retransmission is a first retransmission of the TB, and the next available resource is in a next immediate available slot of the K consecutive slots to a slot of the non-first resource, and
wherein the same HARQ process ID is determined based on an index of a time location of the non-first resource, a periodicity, and a configured maximum number of HARQ processes.

22. The system of claim 21, wherein each of the K resources supports the initial transmission of the TB without dynamic grant.

23. The system of claim 21, wherein the resource configuration is received by the UE via radio resource control (RRC) signaling.

24. The system of claim 21, wherein the UE is configured to receive the resource configuration by:
receiving the resource configuration via a combination of radio resource control (RRC) signaling and downlink control information (DCI) signaling.

25. The system of claim 21, wherein the same HARQ process ID is determined based on the initial transmission.

* * * * *